US009897071B2

(12) United States Patent
Davison et al.

(10) Patent No.: US 9,897,071 B2
(45) Date of Patent: Feb. 20, 2018

(54) WIND AND WATER POWER GENERATION SYSTEM WITH MULTI-STAGE LINEAR GENERATORS

(71) Applicant: Landers Energy Inc., Highwood, MT (US)

(72) Inventors: Gary Davison, Highwood, MT (US); Fred Davison, Highwood, MT (US)

(73) Assignee: LANDERS ENERGY, INC., Highwood, MT (US)

( * ) Notice: Subject to any disclaimer, the term of this patent is extended or adjusted under 35 U.S.C. 154(b) by 21 days.

(21) Appl. No.: 14/677,732

(22) Filed: Apr. 2, 2015

(65) Prior Publication Data
US 2016/0290317 A1 Oct. 6, 2016

(51) Int. Cl.
*F03D 9/00* (2016.01)
*H02P 9/04* (2006.01)
*F03D 5/04* (2006.01)
*F03B 17/06* (2006.01)
*H02K 7/18* (2006.01)
*F03D 5/02* (2006.01)
*H02K 41/03* (2006.01)
*F03D 9/25* (2016.01)
(Continued)

(52) U.S. Cl.
CPC ............... *F03D 5/04* (2013.01); *F03B 17/06* (2013.01); *F03D 5/02* (2013.01); *F03D 9/25* (2016.05); *H02K 7/1869* (2013.01); *H02K 41/031* (2013.01); *H02K 7/08* (2013.01); *H02K 7/09* (2013.01); *Y02E 10/28* (2013.01); *Y02E 10/70* (2013.01); *Y02E 10/725* (2013.01)

(58) Field of Classification Search
CPC ..... F03D 5/02; F03D 5/04; F03B 7/006; F03B 9/00
See application file for complete search history.

(56) References Cited

U.S. PATENT DOCUMENTS

| 1,923,971 A | 8/1933 | Evans |
| 3,548,122 A | 12/1970 | Hay |
| 3,550,535 A | 12/1970 | Rooklyn |

(Continued)

OTHER PUBLICATIONS

"A Catamaran with Venetian Blinds"—Popular Science, Nov. 1974, p. 80.

(Continued)

*Primary Examiner* — Tulsidas C Patel
*Assistant Examiner* — Thomas Quigley
(74) *Attorney, Agent, or Firm* — Thorpe North & Western, LLP

(57) ABSTRACT

A power generation assembly for use in generating electrical power from air or water currents includes a rail system including at least one rail and a vane assembly, drivable by the air or water currents. A car assembly is slidably mounted to the rail and coupled to the vane assembly: wherein movement of vanes of the vane assembly generates linear movement of the car assembly. An electrical energy generating system includes two or more independent sets of stator windings carried by the rail system, and a piston, carried by the car assembly, wherein linear movement of the piston relative to the stator windings generates electrical energy. A switching system is operable to controllably and individually activate each of the two or more independent sets of stator windings.

14 Claims, 20 Drawing Sheets

(51) Int. Cl.
*H02K 7/08* (2006.01)
*H02K 7/09* (2006.01)

(56) References Cited

U.S. PATENT DOCUMENTS

| | | |
|---|---|---|
| 3,730,643 A | 5/1973 | Davison |
| 3,902,432 A | 9/1975 | Shortridge et al. |
| 3,916,797 A | 11/1975 | Block et al. |
| 3,927,330 A | 12/1975 | Skorupinski |
| 3,950,952 A | 4/1976 | Krings |
| 4,144,817 A | 3/1979 | Morita |
| 4,163,905 A | 8/1979 | Davison |
| 4,170,738 A | 10/1979 | Smith |
| 4,500,827 A * | 2/1985 | Merritt .................. H02K 35/02 290/1 R |
| 4,589,344 A | 5/1986 | Davison |
| 4,832,569 A | 5/1989 | Samuelsen et al. |
| 4,859,146 A | 8/1989 | Labrador |
| 5,134,305 A | 7/1992 | Senehi |
| 5,313,103 A | 5/1994 | Hickey |
| 5,350,273 A | 9/1994 | Hector et al. |
| 5,386,146 A | 1/1995 | Hickey |
| 5,758,911 A | 6/1998 | Gerhardt |
| 5,992,341 A | 11/1999 | Gerhardt |
| 6,629,815 B2 | 10/2003 | Lusk |
| 6,672,522 B2 | 1/2004 | Lee et al. |
| 7,075,191 B2 | 7/2006 | Davison |
| 7,276,810 B2 | 10/2007 | Mohring |
| 2004/0164562 A1 | 8/2004 | Latyshev |
| 2004/0168604 A1 | 9/2004 | Zorn et al. |
| 2006/0131890 A1 | 6/2006 | Gizara |
| 2008/0042444 A1 | 2/2008 | Johnson |
| 2008/0157526 A1 * | 7/2008 | Davison ................ F03B 17/064 290/3 |
| 2009/0045634 A1 * | 2/2009 | Sane ..................... F03D 9/00 290/55 |
| 2010/0126374 A1 * | 5/2010 | Ji ......................... B61B 13/08 104/282 |

OTHER PUBLICATIONS

"Integrated Wind-Hydroelectric Generation—Integration of wind and hydroelectric power", Montana Rural Electric News.
Gogins; "Biggest wind machine: 200-ft Turbine Blades Mounted on Rail Cars;" News Trends.
Madaras; "Big electric plant run by wind;" Popular Science Monthly; Jan. 1932.
McCawley; "Dynaship;" Sea Frontiers Magazine, Jan.-Feb. 1973.
Powe et al.; "Development of a large capacity wind powered electrical generating system: A concept;" Research Report, Mechanical engineering Dept. Montana State University, Sep. 1, 1973.

* cited by examiner

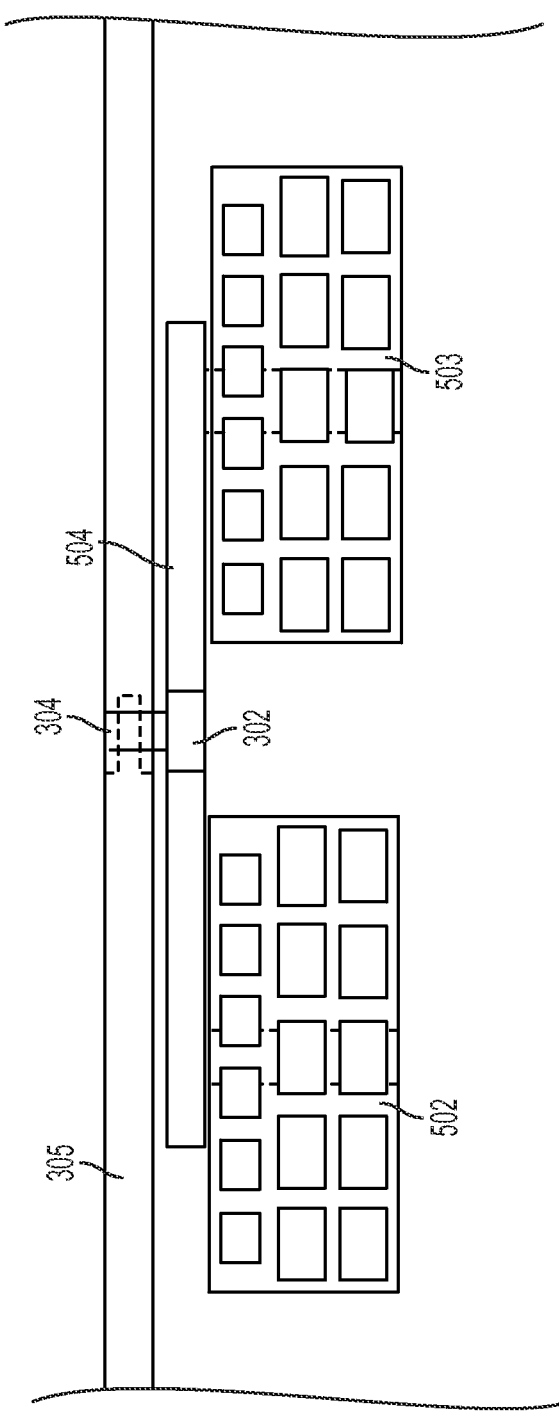

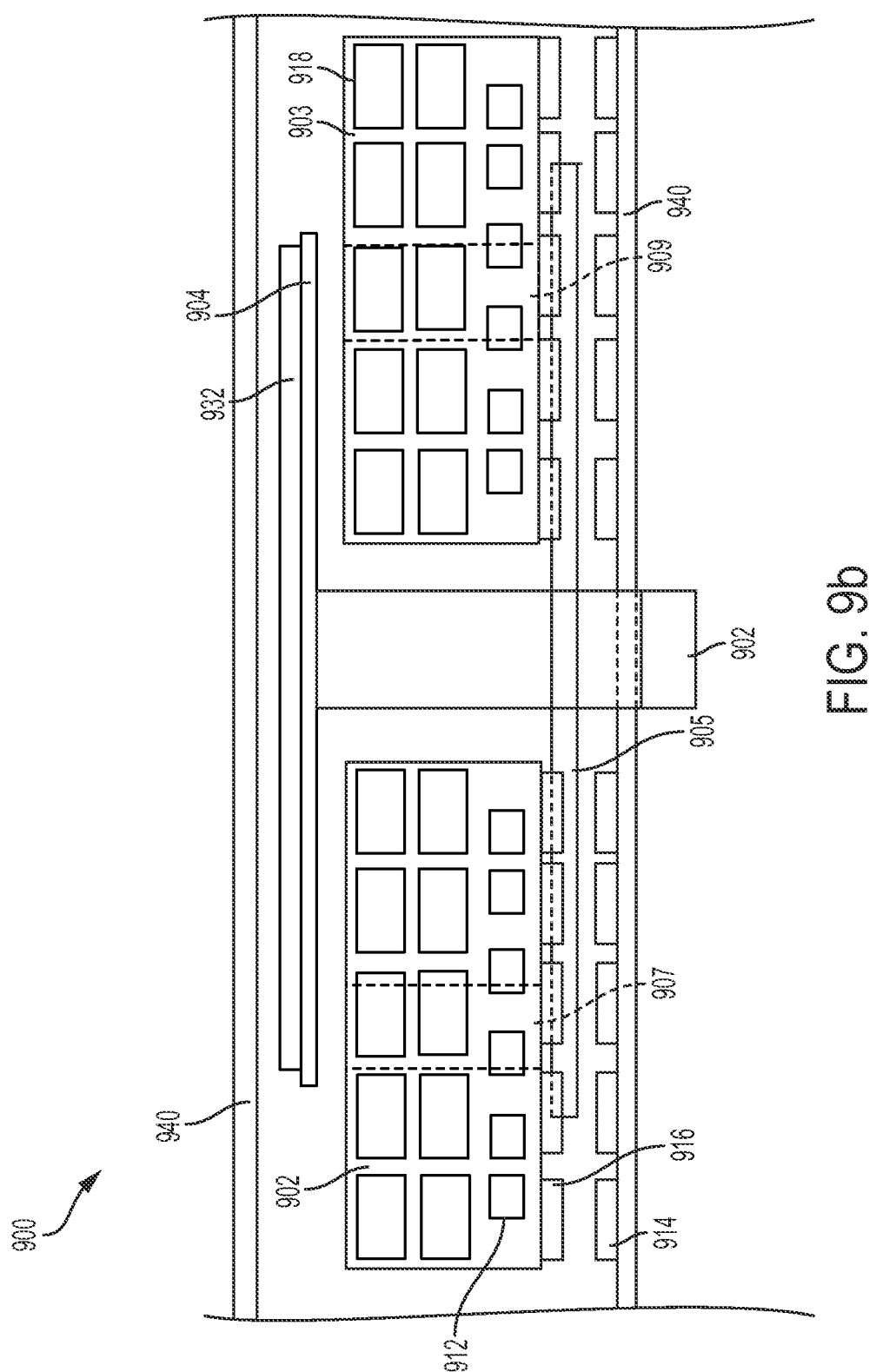

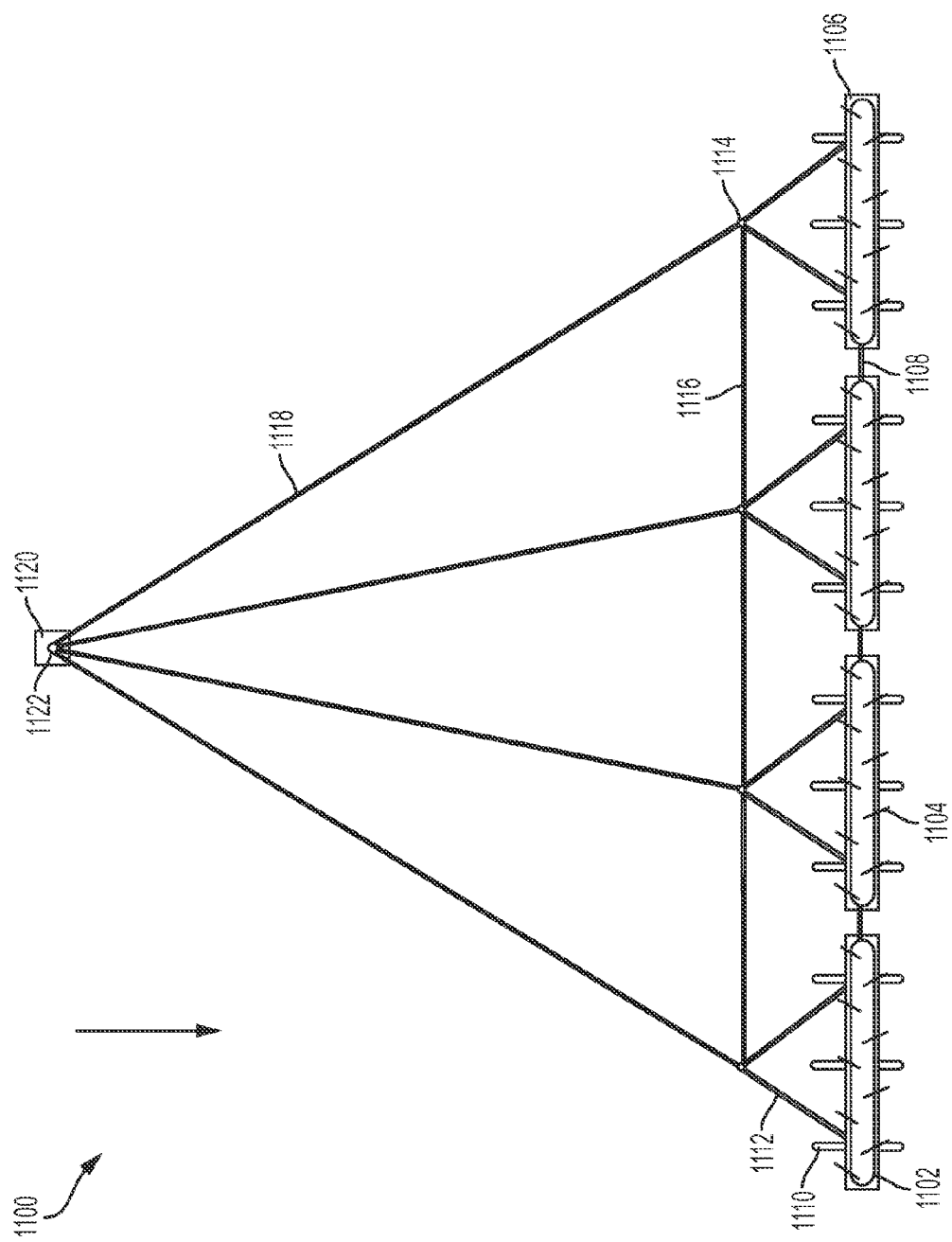

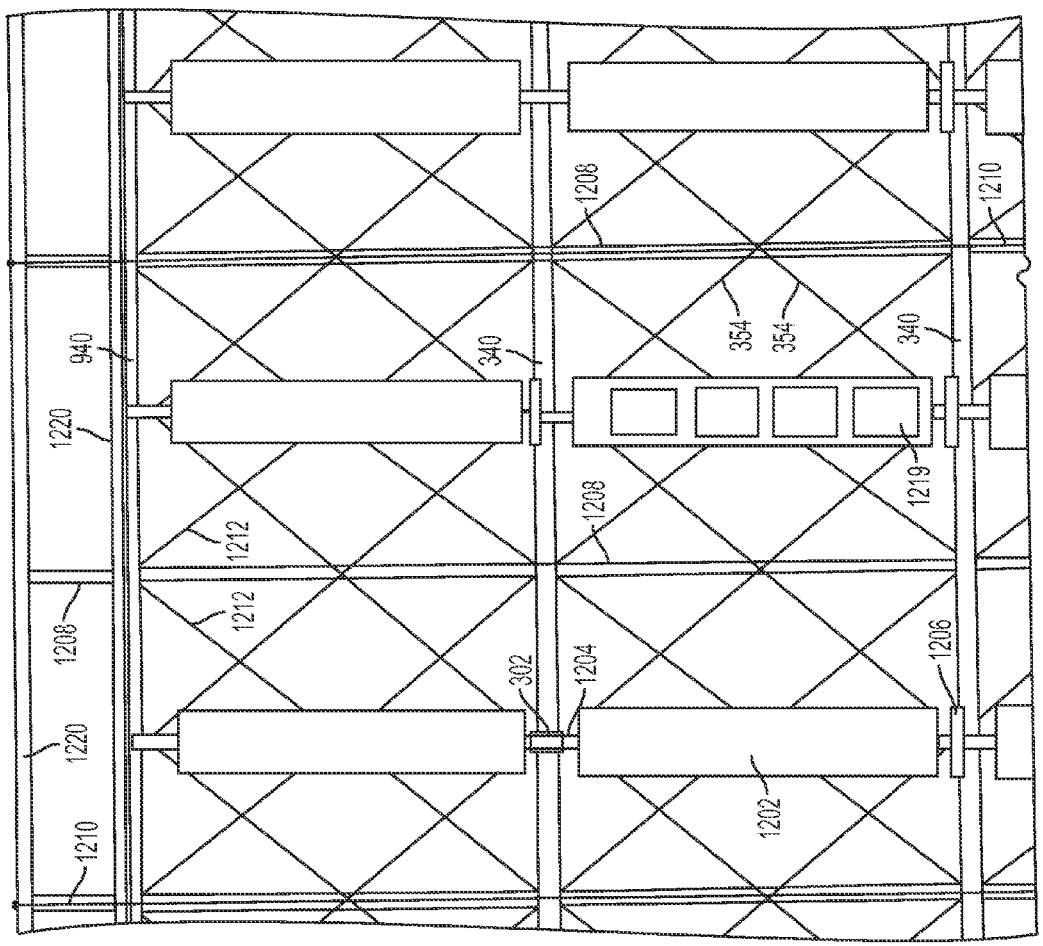
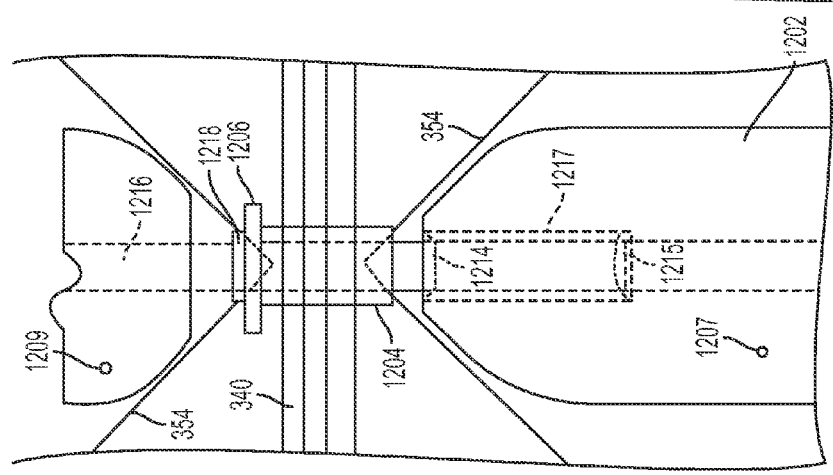
FIG. 12c
FIG. 12b

WIND AND WATER POWER GENERATION SYSTEM WITH MULTI-STAGE LINEAR GENERATORS

BACKGROUND OF THE INVENTION

Field of the Invention

The present invention relates to a power generation assembly for use in generating electrical power from air or water currents.

Related Art

In the last several decades wind and wave power have grown to be worldwide phenomena with spectacular growth in the U.S. Even more recently, the Department of Energy ("DOE") is encouraging the development of systems that will be more efficient in areas with somewhat lower wind speeds, particularly throughout the mid-western states where the resource is considered to be vast, and much development is expected.

With the growing concerns about human caused global warming and instabilities in fossil fuel producing regions of the world, a growing number of people are voicing interest in the development of more wind/wave power and other renewable energy systems.

Examples of systems adapted for harnessing the energy of wind and water are disclosed in numerous patents, many of which are issued to one or more of the current inventors. While the development of such technology has advanced considerably in recent years, designers continue to seek to obtain greater efficiencies in the conversion of wind and water energy to electrical energy.

SUMMARY OF THE INVENTION

In accordance with one aspect of the invention, a power generation assembly for use in generating electrical power from air or water currents is provided. The assembly can include a rail system including at least one rail, and a vane assembly, drivable by the air or water currents. A car assembly can be slidably mounted to the rail and can be coupled to the vane assembly. Movement of vanes of the vane assembly can generate linear movement of the car assembly. An electrical energy generating system can have: i) two or more independent sets of stator windings carried by the rail system, and ii) a piston, carried by the car assembly, wherein linear movement of the piston relative to the stator windings generates electrical energy. A switching system can be operable to controllably and individually activate each of the two or more independent sets of stator windings.

In accordance with another aspect of the invention, a power generation assembly for use in generating electrical power from air or water currents is provided, including a rail system having at least one rail configured in an endless loop, and a vane assembly, drivable by the air or water currents. A car assembly can be slidably mounted to the rail and coupled to the vane assembly. Movement of vanes of the vane assembly generates linear movement of the car assembly. An electrical energy generating system can have i) at least one set of stator windings carried by the rail system, and ii) a piston, carried by the car assembly, wherein linear movement of the piston relative to the stator windings generates electrical energy. The at least one rail is supported upon, or at least partially submerged in, a body of water.

In accordance with another aspect of the invention, a power generation assembly for use in generating electrical power from air or water currents is provided, including a rail system having at least one rail configured in an endless loop. A vane assembly is drivable by the air or water currents. A car assembly is slidably mounted to the rail and coupled to the vane assembly. Movement of vanes of the vane assembly generates linear movement of the car assembly. An electrical energy generating system can have: i) at least one set of stator windings carried by the rail system, and ii) a piston, carried by the car assembly, wherein linear movement of the piston relative to the stator windings generates electrical energy. A series of permanent levitation magnets can be arranged within the rail, and a series of permanent levitation magnets can be arranged on the car assembly, the levitation magnets cooperatively providing a lifting force sufficient to levitate the car assembly and the vane assembly coupled to the car assembly.

Additional features and advantages of the invention will be apparent from the detailed description which follows, taken in conjunction with the accompanying drawings, which together illustrate, by way of example, features of the invention.

BRIEF DESCRIPTION OF THE DRAWINGS

The following drawings illustrate exemplary embodiments for carrying out the invention. Like reference numerals refer to like parts in different views or embodiments of the present invention in the drawings.

FIG. 7c is a side sectional view of a conveyance assembly;

FIG. 9b is a side sectional view of a monorail;

FIG. 11 is a top view of a barge monorail system in accordance with an aspect of the invention;

FIG. 12b is a sectional view of upper and lower airfoils of a monorail system; and FIG. 12c is a side view of a section of a monorail system incorporating solar panels in accordance with an embodiment of the invention.

DETAILED DESCRIPTION

Figure 1:
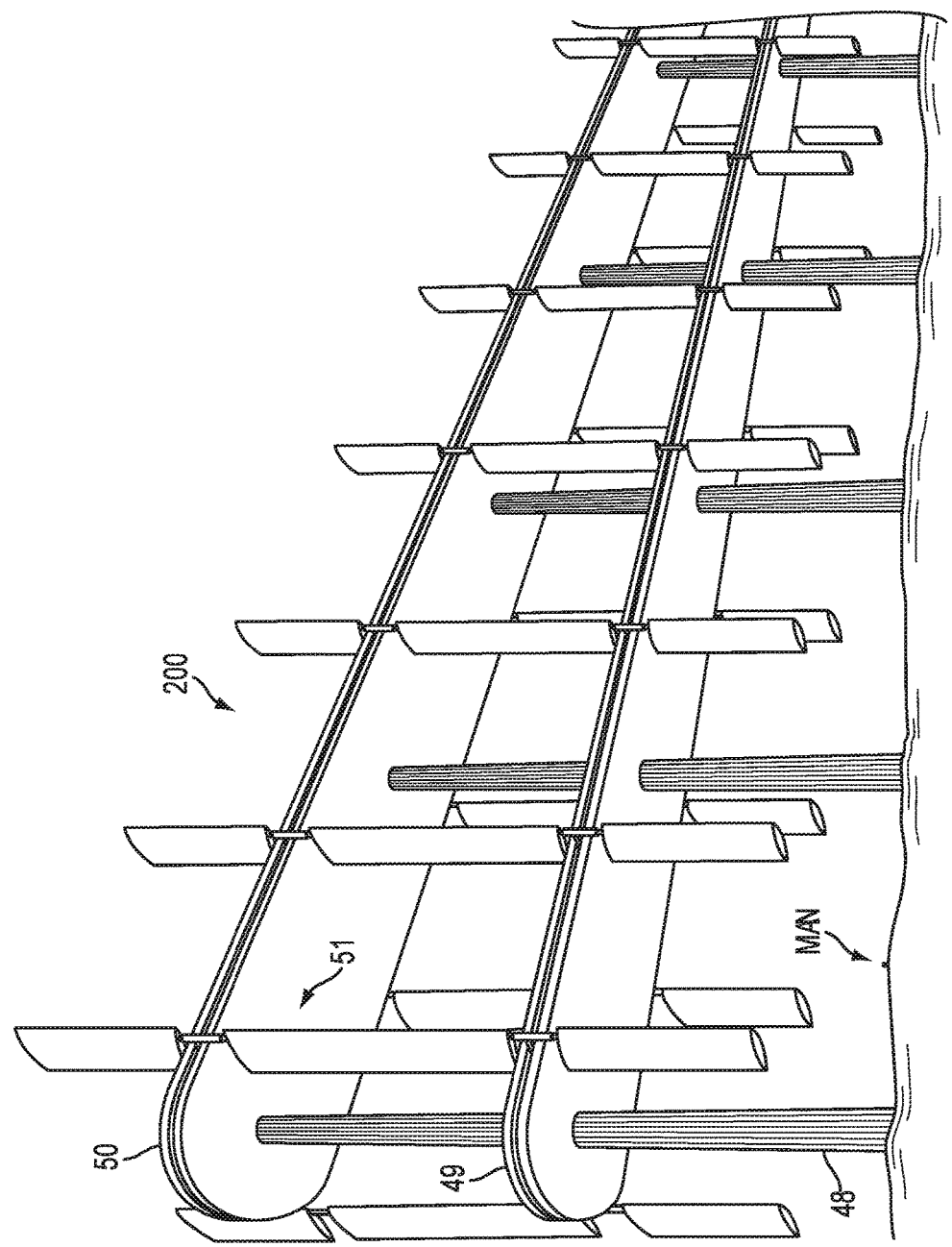
FIG. 1 is a perspective view of a prior art wind and water power generation system illustrating the general concept of such systems.

Reference will now be made to the exemplary embodiments illustrated in the drawings, and specific language will be used herein to describe the same. It will nevertheless be understood that no limitation of the scope of the invention is thereby intended. Alterations and further modifications of the inventive features illustrated herein, and additional applications of the principles of the inventions as illustrated herein, which would occur to one skilled in the relevant art and having possession of this disclosure, are to be considered within the scope of the invention.

Definitions

As used herein, the singular forms "a" and "the" can include plural referents unless the context clearly dictates otherwise. Thus, for example, reference to "a linkage" can include one or more of such linkages, if the context dictates.

As used herein, the term "substantially" refers to the complete or nearly complete extent or degree of an action, characteristic, property, state, structure, item, or result. As an arbitrary example, an object that is "substantially" enclosed is an article that is either completely enclosed or nearly completely enclosed. The exact allowable degree of deviation from absolute completeness may in some cases depend upon the specific context. However, generally speaking the nearness of completion will be so as to have the same overall result as if absolute and total completion were obtained. The use of "substantially" is equally applicable when used in a negative connotation to refer to the complete or near complete lack of an action, characteristic, property, state, structure, item, or result. As another arbitrary example, a composition that is "substantially free of" an ingredient or element may still actually contain such item so long as there is no measurable effect as a result thereof.

As used herein, the term "about" is used to provide flexibility to a numerical range endpoint by providing that a given value may be "a little above" or "a little below" the endpoint.

Relative directional terms are sometimes used herein to describe and claim various components of the power generation systems of the present invention. Such terms include, without limitation, "upward," "downward," "horizontal," "vertical," etc. These terms are generally not intended to be limiting, but are used to most clearly describe and claim the various features of the invention. Where such terms must carry some limitation, they are intended to be limited to usage commonly known and understood by those of ordinary skill in the art.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

Numerical data may be expressed or presented herein in a range format. It is to be understood that such a range format is used merely for convenience and brevity and thus should be interpreted flexibly to include not only the numerical values explicitly recited as the limits of the range, but also to include all the individual numerical values or sub-ranges encompassed within that range as if each numerical value and sub-range is explicitly recited. As an illustration, a numerical range of "about 1 to about 5" should be interpreted to include not only the explicitly recited values of about 1 to about 5, but also include individual values and sub-ranges within the indicated range. Thus, included in this numerical range are individual values such as 2, 3, and 4 and sub-ranges such as from 1-3, from 2-4, and from 3-5, etc., as well as 1, 2, 3, 4, and 5, individually.

This same principle applies to ranges reciting only one numerical value as a minimum or a maximum. Furthermore, such an interpretation should apply regardless of the breadth of the range or the characteristics being described.

Invention

Figure 2:
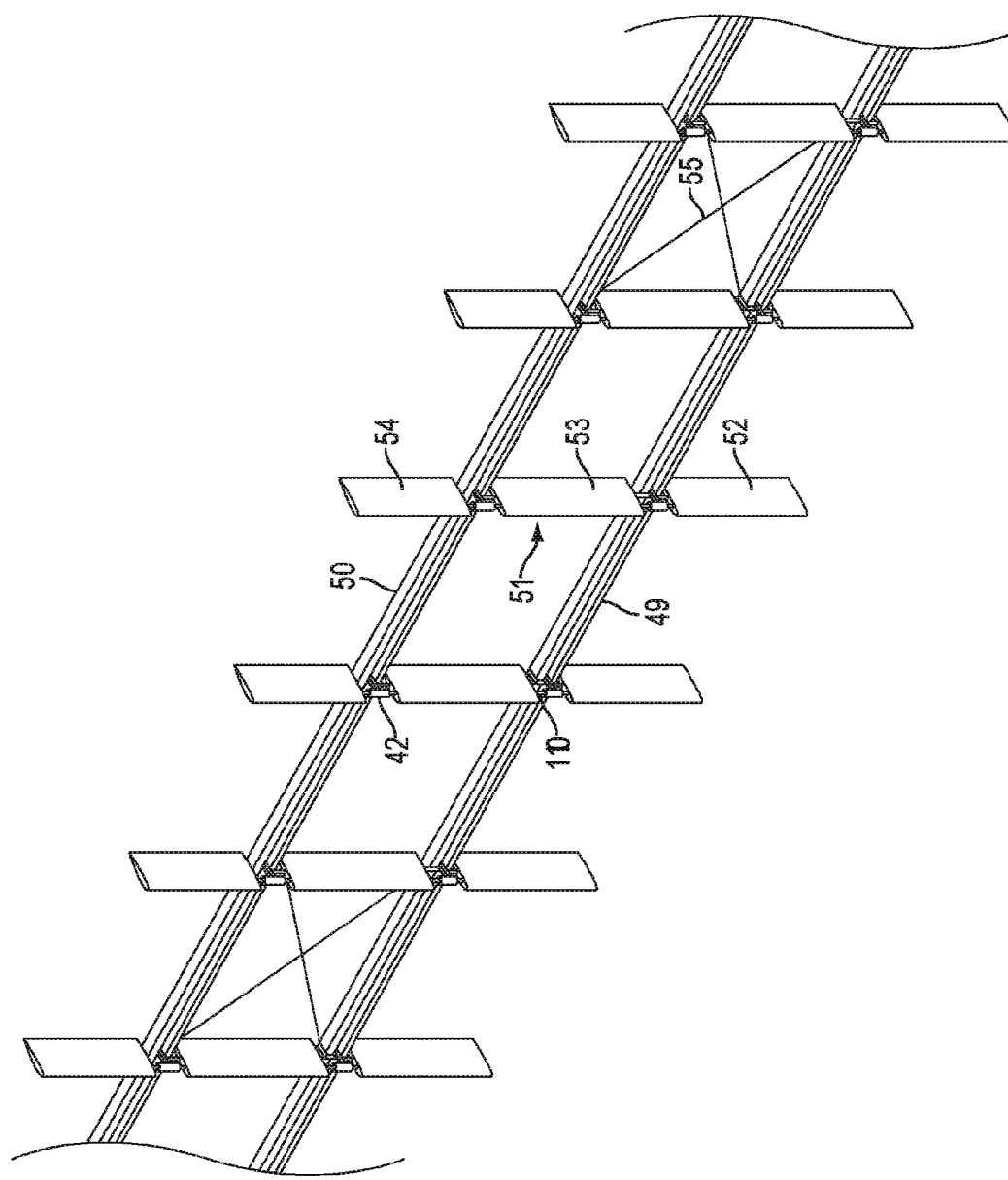
FIG. 2 is a more detailed, sectional view of various components of the prior art system of FIG. 1.

The present technology relates generally to wind- and water-driven systems that convert movement of vanes into electrical energy. One exemplary structure that can be utilized with the teachings of the present invention is shown in FIGS. 1 and 2. In this conventional system, developed by one or more of the present inventors, a power generation system 200 can include a lower monorail 49 and an upper monorail 50 supported by a common pole support 48. Numerous vane assemblies 51 are shown, although it is noted that the actual number of vane assemblies 51 used in each power generation assembly 49 and 50 may vary. The vane assembly 51 can consist of a frame 110 and at least one gang of vanes 52 and 54 positioned on the frame 110.

FIG. 2 shows this exemplary system including sails or vanes 52, 53, and 54 that are coupled to a common frame which is pivotal in sleeve bearings 42 and are supported by a linkage portion 64. The linkage portion connects to car assembly 112 within monorail 49,50. Each sail assembly 51 is supported by guy cables to keep upper and 5 lower car assemblies that share a common frame, aligned within each monorail.

Figure 3A:
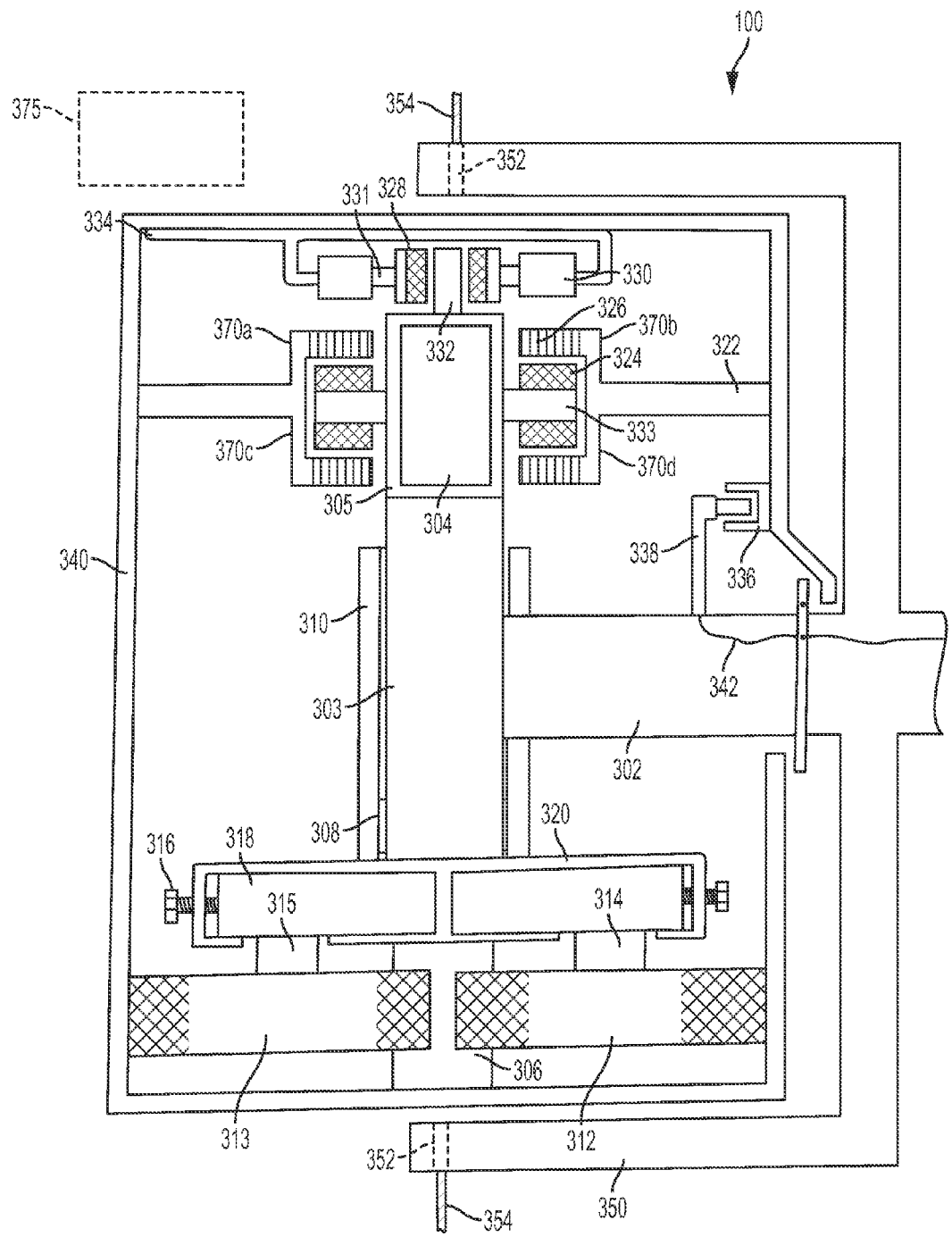
FIG. 3a is sectional view of various components of a carrier car system in accordance with an aspect of the invention.

This conventional system is provided for exemplary purposes only to give a broad overview of the overall function of the present technology. It will be appreciated, from FIG. 1, that the systems can be very large (see reference to a man in this figure). Thus, while many of the present figures are necessarily drawn to show very small components of the system, the overall system can be quite large. The specific teachings relevant to the present technology are as follows:

FIG. 3(a) depicts an exemplary carrier car system within a monorail 340 having carrier wheel 306 providing vertical support which turns on bearings and shaft 308 upon a swivel yoke 310. The swivel yoke 310 can be attached to a linkage portion 303 which is solidly connected to sail assembly support element 302, which in turn extends outside of the monorail 340 to secure the mast support sleeve of sail assembly. An electrified slot track 336 can supply current to slot track forcer or piston 338 and electrical line 342 to power sail positioning servos on a sectionally constructed sail mast.

Side thrust wheels 312 and 313 can provide support against various wind forces. Side thrust wheels 312 and 313 rotate on axles 314 and 315 that are positioned by a thrust wheel adjustment screw 316. The adjustment screw can work upon extending elements 318 that can slide within an extending channel support 320 to provide constant contact centering adjustments within the sides of the monorail 340.

Connecting element 305 can be rigidly secured to linkage portion 303 and can pivot on sleeve 304 and can extend longitudinally through the monorail to attach by tongue and groove to an identical portion 303 at a trailing carrier car (which can be referred to herein as a "train").

A linear generator support brace 332 can be attached to the sides of the monorail 340. Linear generator stator windings 326 can be placed on the upward and downward portions of the "U" shaped part of the brace 322. The connecting element 305 can include a forcer flange 333 that extends outward and to the sides of element 305 with permanent magnets 324 deployed on the top and bottom of forcer flange 333. The forcer flange can extend along at least a portion of the length of connecting element 305 or along the full length of connecting element 305.

When wind initiates force upon the sails, the movement of the carrier cars 100 and connecting elements 305 move the permanent magnets 324 past the stator windings 326 to create electrical power. This permanent magnet linear generator configuration can be switched on or off (that is, each can be selectively activated). Each side can have at least two points of switching; top and bottom. FIG. 3(a) shows four linear generators, indicated at 370a, 370b, 370c and 370d. Any one or more of the four can be switched on or off depending on the need for power-take-off. All generators may be turned off (de-activated) at start up to allow the train to move freely. Reverse polarity applied to the PTO may be used to initiate startup in low wind speed if needed; temporarily using it as a linear motor rather than a linear generator. Also, an Eddy Current can be induced to slow or serve to support the braking of the system. Any combination of electrically live generators (up and down or crossways) may be used in this four stage linear generator configuration.

This system may operate as a single unit wind farm with individual generator sections being turned on, one at a time, as wind speed increases. As an example, linear generators on both straight lengths of the elongated oval loop (shown in FIGS. 8a-8d) can create the ability to have four steps of generating capacity each for a cumulative total of eight steps or levels of generation. That is, a 16 MW system can feed quality power to the grid at 2 MW, 4, 6, 8, 10, 12, 14, and a total of 16 MWs as each individual generator segment is switched on. All the while, the train travels at a predetermined speed.

An electronic controller unit (shown by example at 375) may be incorporated to manage a substantially balanced amount of power-take-off from each level of monorail. This can eliminate, for example, possible racking (wherein a monorail above a lower monorail may tend to run ahead of a lower monorail). In the case of high-speed maglev trains, adjustments of 4,000 to 10,000 per second can be made to ensure a smooth ride. This 'power on' concept may be analogous to the 'power off' concept discussed herein in order to get the multiple monorail trains to run at near equal PTO.

A braking surface flange 332 can extend upward and can extend the full length of connecting element 305. A hydraulic plunger 330 can activate a hydraulic pressure line 334 that can in turn push plunger cylinder 331 and brake pad 328 against braking surface 332 to stop the train.

A cable support frame 350 can extend from sail assembly support element 302 to fasten airfoil guy cables 354 at airfoil guy cable supports 352 both above and below the outsides of monorail 340.

The side thrust or guide wheels 312 and 313 can be adjusted so the carrier car has very little, if any, sideways movement. This design can provide a number of advantages over spring-loaded designs, which allow the wheels to 'give' slightly.

The design of the sail assembly support element 302 also provides advantages:

a) Extensions can loop around the top and bottom of the monorail to support guy cables in alignment with the center of the car. This cable-guyed concept can aid in eliminating the longitudinal connecting element in monorails above or below a main monorail. It reduces structural material and provides more wind-swept area per generator; and b) An electrified slot track can power the servo(s).

The system provides greater "wind swept" area per generator and much more overall system performance management, as opposed, for example, to conventional wind turbines which can be constrained to putting all power parts in a nacelle at the top of a tower.

The present linear generators are quiet, the require very little maintenance, are tolerant of some debris, and have near zero friction. The present system does not require a gearbox. Another advantage of the present system is that start up can happen in very low wind speed.

Figure 3B:
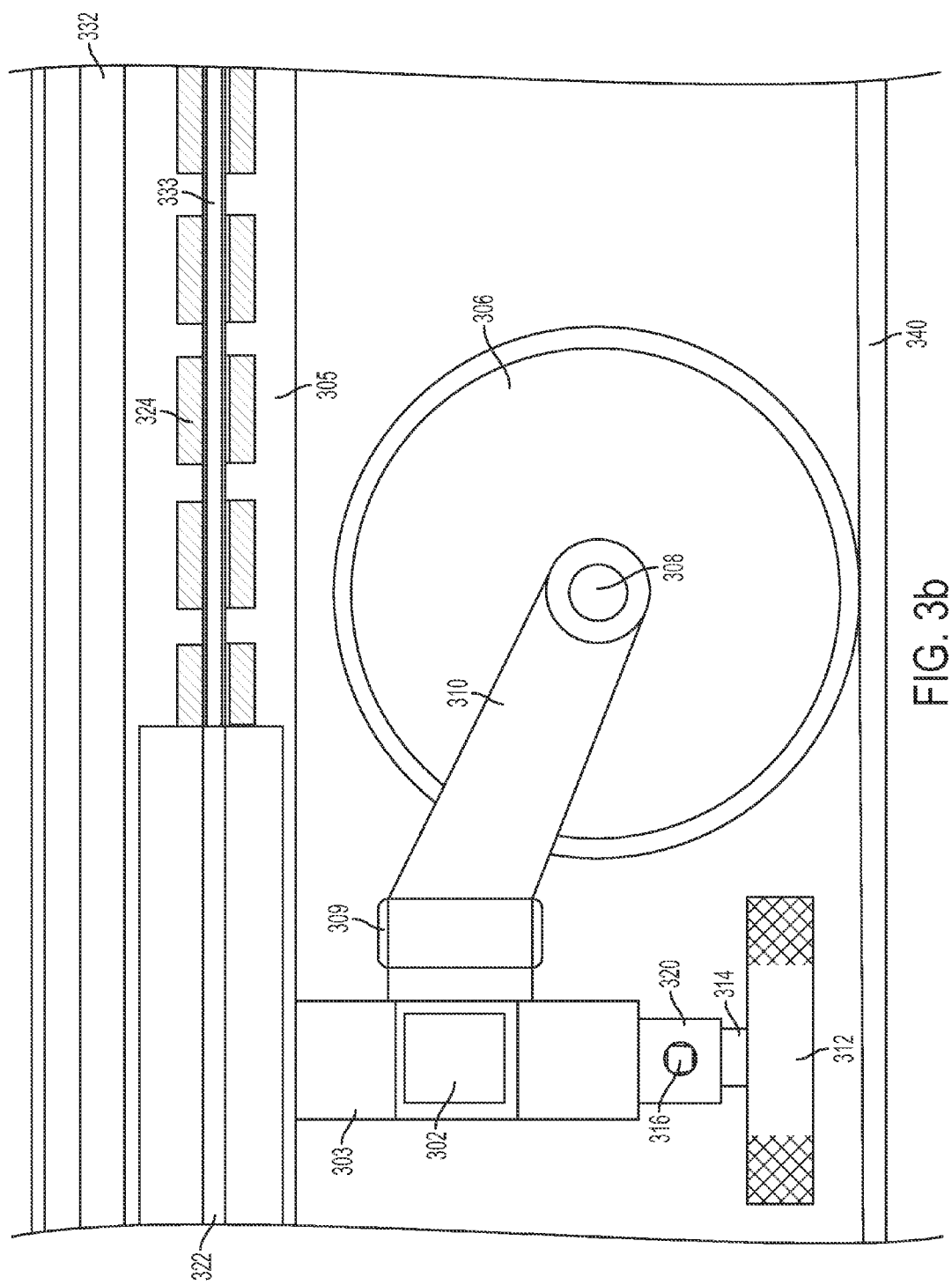
FIG. 3b is a side sectional view of another carrier car assembly.

FIG. 3(b) is a side sectional view of a carrier car assembly 100 showing carrier wheel 306, swivel yoke 310, and swivel bearings and shaft 309. The connecting element 305 with the forcer flange 333 and permanent magnet array 324 sides through and past the support brace with windings 322. In the embodiment shown, carrier wheel 306 can swivel 360 degrees. This is advantageous in that the train can traverse in either direction through the monorail. The linear generators can be modified to operate with the magnets moving in either direction relative to the windings. Depending on the wind direction, the leading length; the length that receives the force of the wind first; of the elongated loop should be moving in a direction that takes the most advantage aerodynamically of that wind direction. If the wind angle to the straight side is 10% off of perpendicular, more power would be produced if the system was moving slightly into the wind, effectively creating more lift because of a higher 'relative' wind speed. This is advantageous since the leading length is generally going to be where most of the power is produced because the return length can experience turbulence from the leading airfoils.

Figure 3C:
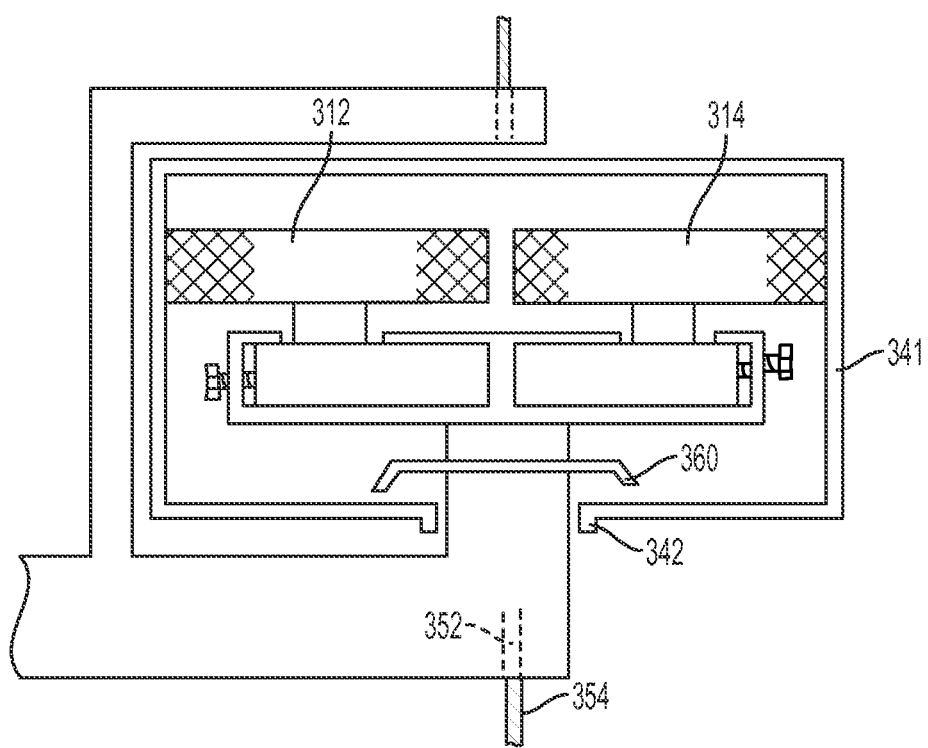
FIG. 3c is a front sectional view of a monorail in accordance with an aspect of the invention.

FIG. 3(c) shows a front cut view of a monorail 341 with an opening at the bottom with extension segments 342 and a baffle component 360 which minimizes debris entering the inside of the monorail 341. The use of the extension segments 342 and the baffle 360 can minimize or eliminate splashing in a water application. The side thrust wheels 312 and 314 and supporting components are identical to those shown in FIG. 3(a), except that they are inverted.

Depending upon the configuration being considered, a monorail above or below a main monorail (with the main monorail being set up with a PTO and brake) may not need to have its own PTO and brake as the power would be transferred through the cables to the main monorail. Again, more wind swept area per generator. The downward weight of the sail assembly can be born by the main monorail and the orientation of the guide wheels can be maintained by the sleeve section holding the mast. The sleeve section can be long enough to substantially use the mast's rigidness to hold this guide wheel assembly in a predetermined position.

Figure 4:
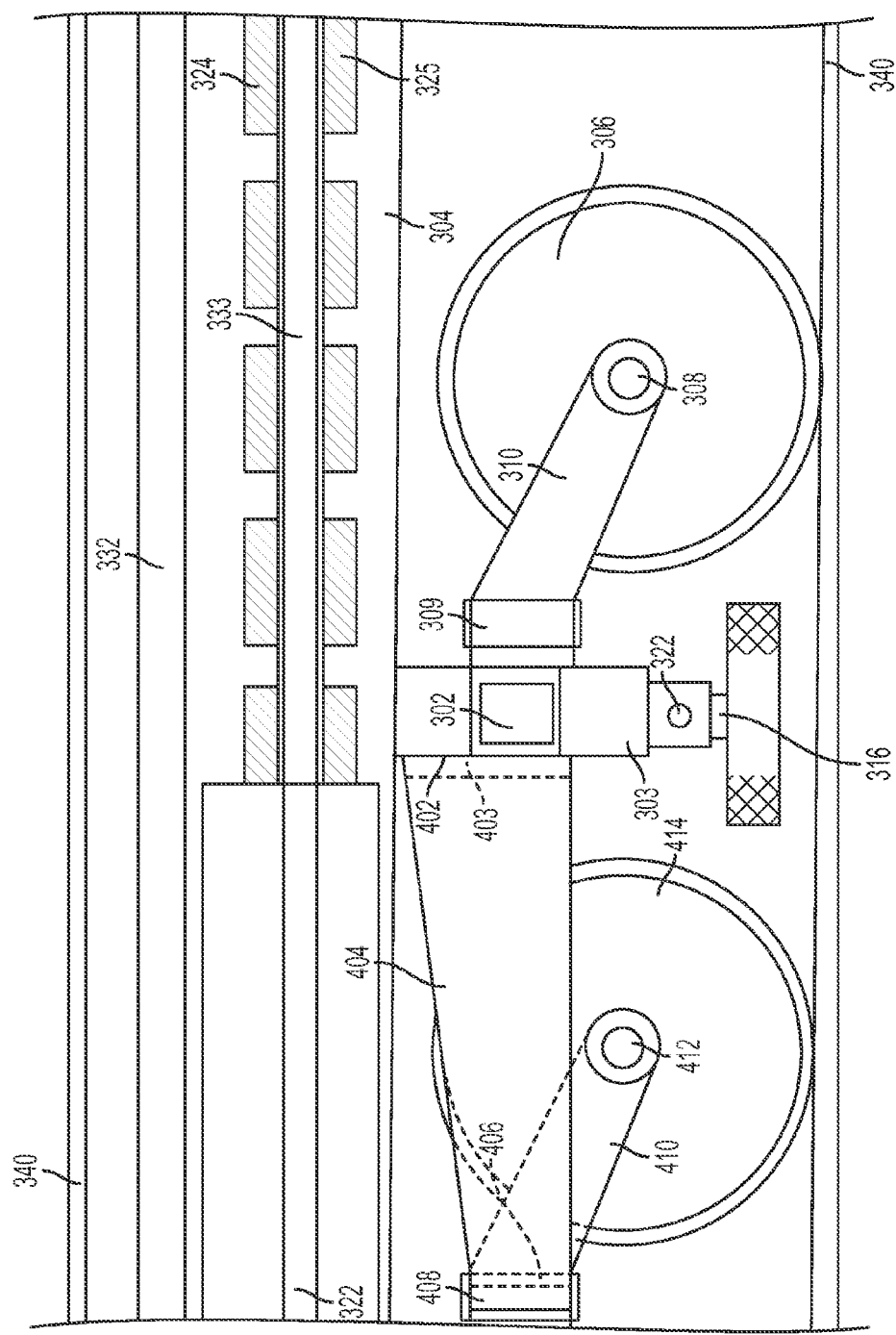
FIG. 4 is a side sectional view of a carrier car in accordance with an aspect of the invention.

FIG. 4 is a side sectional view of a carrier car 100 with an additional carrier wheel assembly at the front end of a carrier car 100. A front carrier wheel support beam 404 is attached to the linkage portion 303 by an offset flange 403. The offset flange is solidly attached to a linkage portion 303. A front offset flange 406 is equally offset to the offset of flange 403.

These offset portions 403,406 are designed to allow clearance for turning at the curved ends of the elongated oval track. The front carrier wheel 414 rotates on and axle and bearings 412 that is guided by a swivel yoke 410 at swivel bearings and axle 408.

Figure 5:
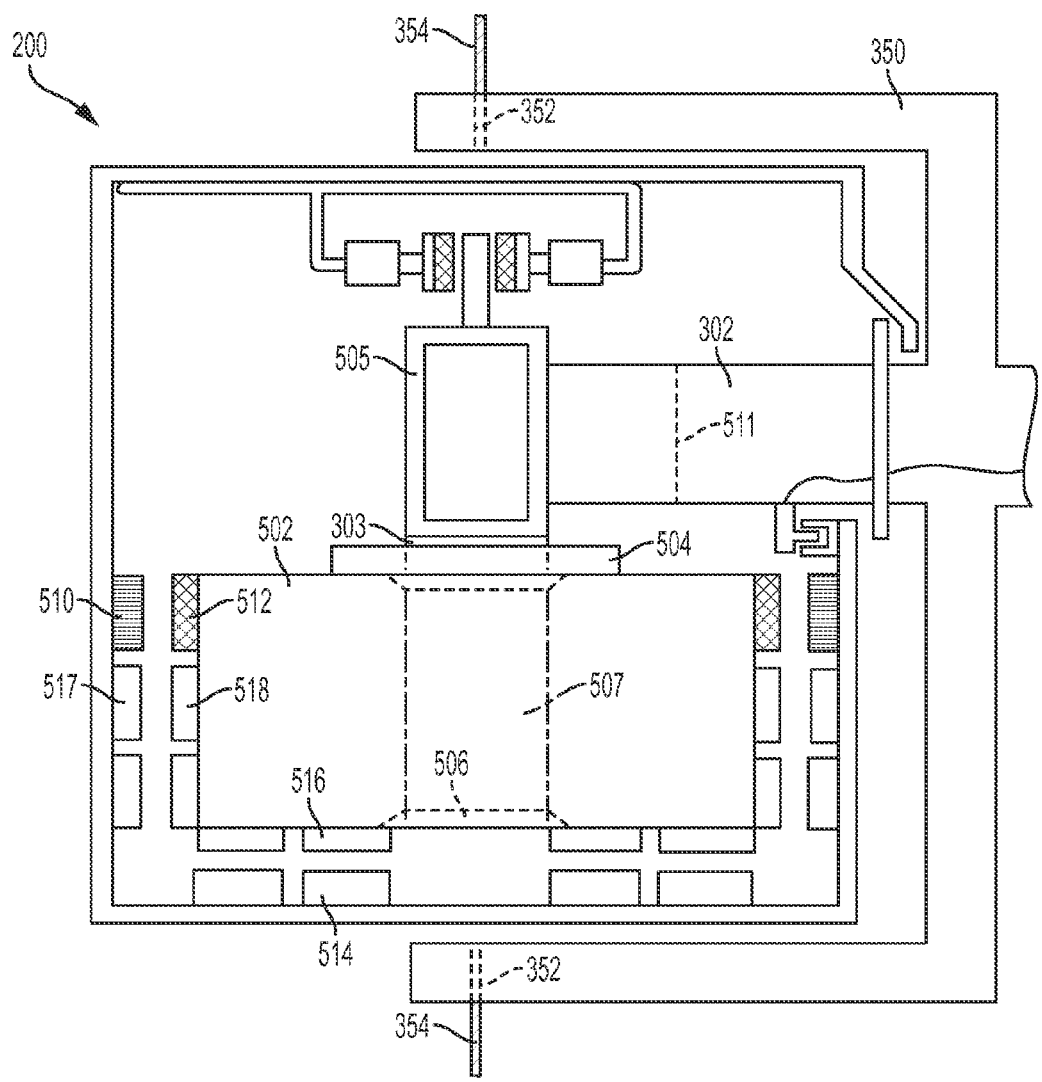
FIG. 5 is a front view of a conveyance assembly in accordance with an aspect of the invention.

FIG. 5 shows a front view of a passive maglev (magnetic levitation) conveyance assembly 200 wherein the linkage portion 302 and 303 are secured to a bogie unit 502 by a bogie hitch element 504. The hitch element 504 can include a reinforcing brace 511 that is built upon maglev connecting element 505 and rests upon and rotates within the bogie 502 upon a bogie swivel shaft 507 secured by bearings at the top and bottom 506. The bogie unit 502 is passively levitated by permanent levitation magnets 516 deployed across the underside of the bogie 502 which interact repulsively with permanent levitation magnets 514 attached to the bottom of the monorail 340 aligned, poll to like poll, i.e., "N" toward "N" or "S" toward "S".

Side thrust permanent magnets 518 can be attached to the sides of the bogie 502 and side thrust monorail mounted permanent magnets 517 can be placed opposite and to the sides of the monorail 340 and are aligned, like poll to like poll. The square area of the sides and bottom of the bogie 502 is substantial enough to join a predetermined amount of magnets to levitate the weight of the conveyance assembly including the weight of the airfoils, and to counteract the side thrust of the wind.

Permanent magnet linear generator windings 510 are attached to the monorail 340 and permanent magnet linear generator magnets 512 are secured to the sides of the bogie approximate and opposite the maglev assembly windings 510, which comprise a dual permanent magnet linear generator. The two may be switched on or off to work together or separately.

Figure 6B:
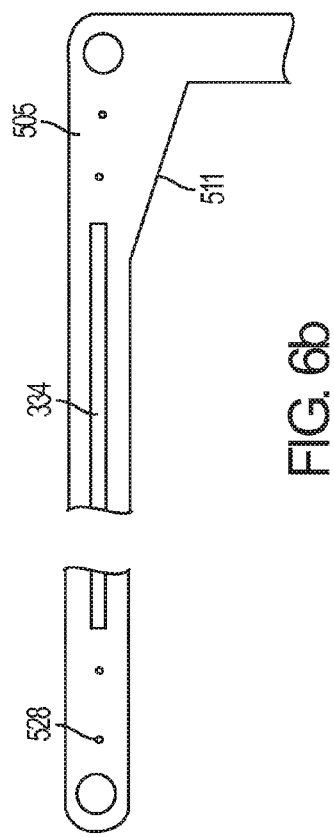
FIGS. 6a and 6b are side sectional views of a conveyance assembly in accordance with an aspect of the invention.
Figure 6A:
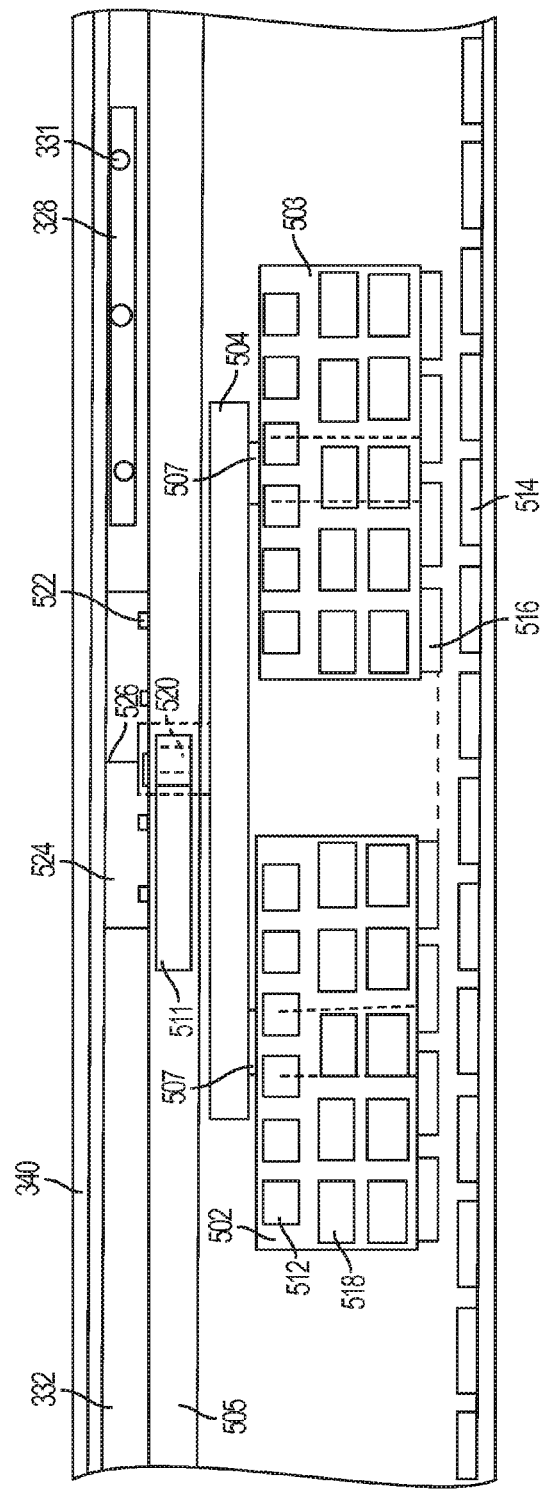

FIGS. 6(a) and (b) show a side sectional view of a tandem bogie passive maglev conveyance assembly 200 and a top cut view of a tandem assembly to tandem assembly connecting element 505, respectively. A bogie unit 503 is identical and positioned in reverse to bogie unit 502 and they both are connected in tandem by the bogie hitch element 504. Hitch element 504 can include a bogie hitch element shaft 520 that extends upwards from the center of said hitch at which point tongue and grooved maglev connecting elements 505 have a reinforcing portion 511. A brake pad 328 can be activated by plunger cylinder 331 and is a length sufficient to operate smoothly through sections of removable braking surfaces 524 with beveled ends 526 secured by removable braking surface bolts 522. Removable braking surfaces 524 attachment holes 528 in FIG. 6(b) are for the removable brake surface bolts 522. Braking surface sections 524 must be removable for service of the connecting elements 505 joining point. The beveled portion 526 is at a pivot point for the train end turns.

This design can ensure that there is enough square area for opposing magnets to support the weight and thrust. This divides up the full rectangular shape to traverse the curved ends of the loop.

The connecting element 505 includes a shape configured to equalize the side thrust on bogies 502 and 503. The forward urging is reinforced by the brace 511. A percentage of the forward thrust is thus experienced as a slight side thrust dispersed evenly along the sides of the tandem bogies. FIG. 7(b) shows a different sail support that provides additional advantages.

The present monorail design simplifies PTO arrangement and increases its efficiency. The design of the train minimizes the vertical area of the monorail: thus, it can be made wider if more structure is needed, so as not to increase size upwardly and downwardly so as to avoid obstructing the flow of the wind.

Figure 7A:
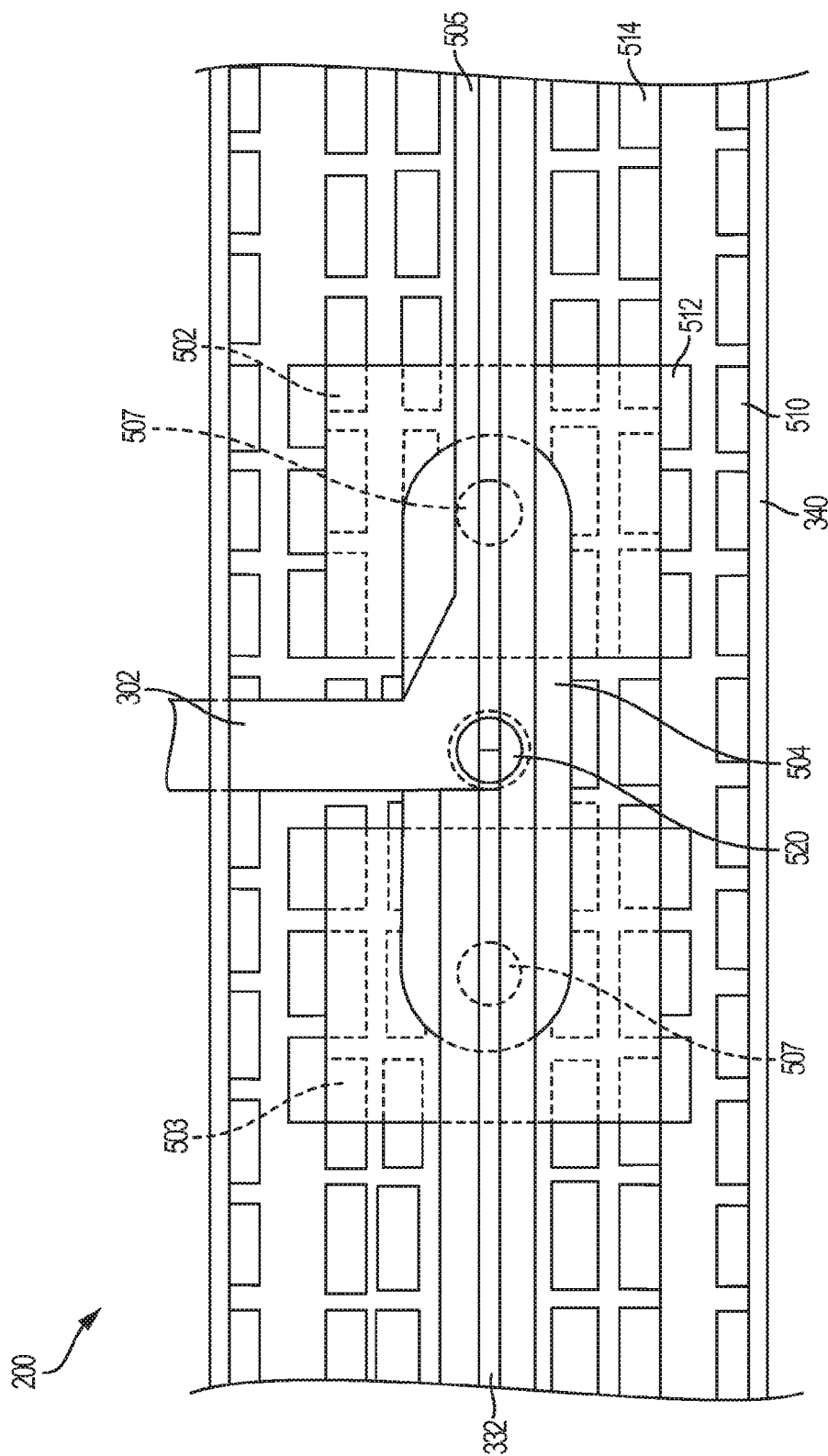
FIG. 7a is a top sectional view of a conveyance assembly.
Figure 7B:
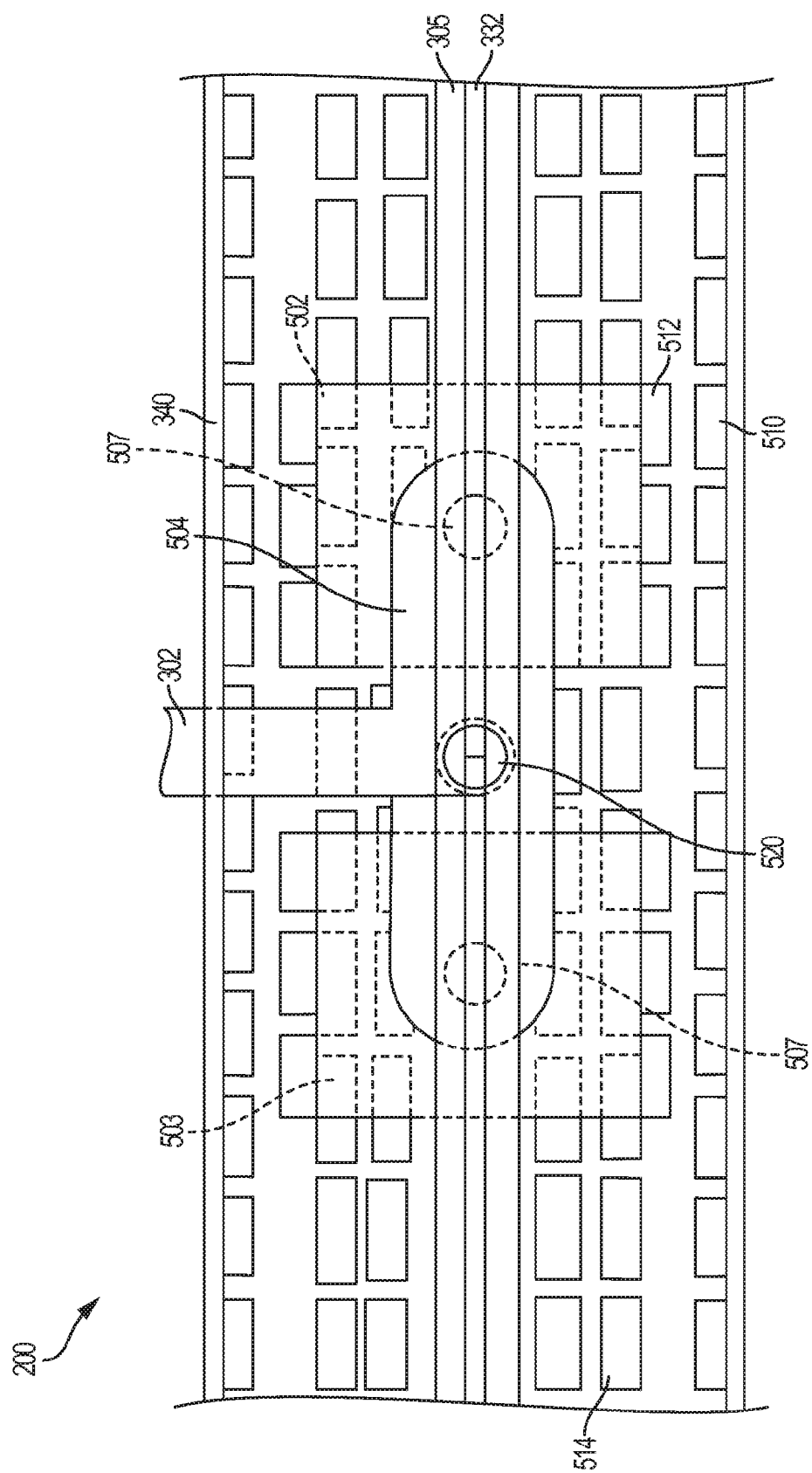
FIG. 7b is a top sectional view of a conveyance assembly.

FIG. 7a is a top sectional view of a tandem bogie maglev conveyance assembly 200 with a sail assembly support element 302 joined to a maglev connecting element 505. The components are arranged so as to evenly place distributed forces on the bogies 502 and 503.

FIG. 7(b) is top view of a tandem bogie maglev conveyance assembly 200 with a sail assembly support element 302 joined to a bogie hitch element 504.

FIG. 7(c) shows a side sectional view of tandem bogie maglev conveyance assembly 200 with a sail assembly support element 302 joined to a bogie hitch element 504. This arrangement orients the sail support assembly straight out from the monorail at all times. The system illustrated in FIG. 9 is also configured this way.

This illustrates a variation on part 504. In this arrangement, the sail support element 302 is connected directly to 504 rather than 302 being part of the longitudinal part 505. In this case, connecting element 305 is used. The advantage here is that the orientation relative to the monorail of portion 302 is always going to be straight out from the monorail, even while it traverses around the curved ends of the elongated oval loop.

Figure 8B:
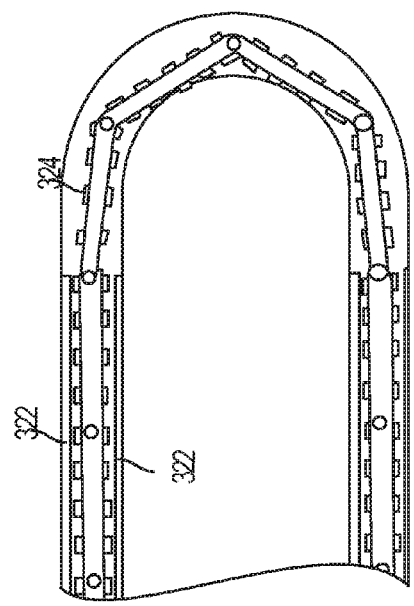
FIG. 8b is a top sectional view of a carrier car system.
Figure 8A:
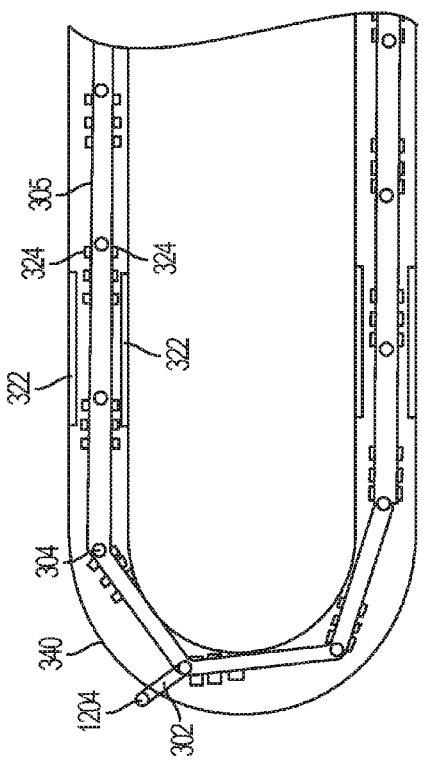
FIG. 8a is a top sectional view of a carrier car train in accordance with an embodiment of the invention.
Figure 8D:
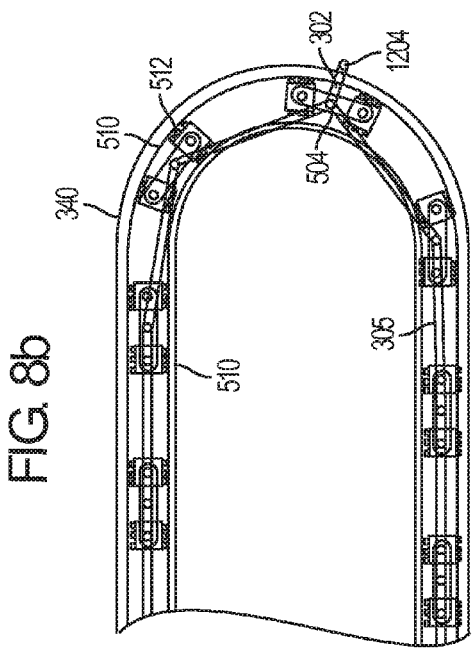
FIG. 8d is a top sectional view of a monorail system.

With reference to FIGS. 8a-8d, FIG. 8(a) shows how when the portion 302 is solid to tongue and grooved connector beam 305; it exits the monorail on the curved ends in a way that is skewed. Alternatively, FIG. 8(d) shows how the part 302 extends out from the monorail straighter relative to the curve. This would reduce slightly the length of part 302 as it is shown in FIG. 8(a).

The disadvantage is that the forward force on the part 302 transferred through part 504 would put side thrust on opposite sides of bogies 502 and 503, and similarly, counteracting side thrust forces on opposite sides of the monorail. Another advantage is that 302 being an integral part of 504 puts the stress points more approximate to where they are managed closer to the tandem bogies.

FIG. 8(a) is a top cut view of the train of a wheel guided carrier car train 100 within a monorail 340 with sections of passive permanent magnet linear generator units 322. Each section of generator is of a length that is at least as long as will provide a constant flow of electrical output from the movement of the sectioned permanent magnet arrays 324 traversing through the windings portions 322.

As at least one magnet array is exiting a windings section, another must be entering simultaneously to ensure a constant flow of electrical output. This scenario allows for a reduced number and length of attached magnets 324 along the connecting elements 305, and eliminates the need for a full length of windings portion 322 along the straight sections of the monorail system 100.

FIG. 8(b) show a top cut view of carrier car system 100 with magnet arrays 324 attached throughout the full length of the connecting elements 305 and windings portions run the full length of each straight portion of the oval loop.

Figure 8C:
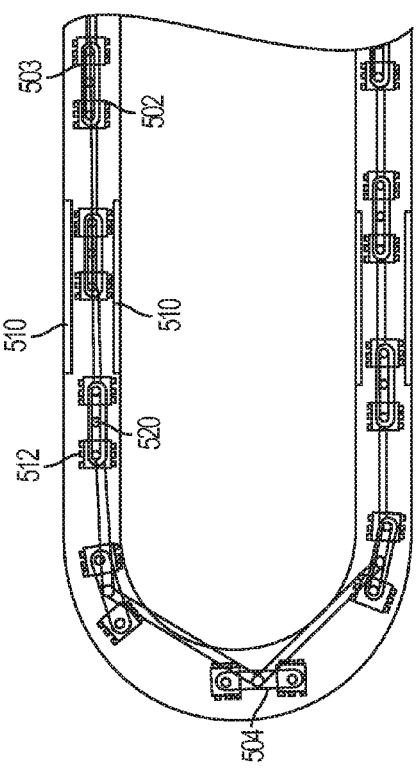
FIG. 8c is a top sectional view of a monorail system in accordance with an aspect of the invention.

FIG. 8(c) is a top cut view of a passive permanent magnet maglev monorail system 200 with sectioned linear generator units 510 that are of sufficient length so that as one tandem bogie assembly 502, 503 with magnetic arrays 512 exits a length of windings 510, while another tandem bogie assembly is entering simultaneously to ensure a constant flow of electrical output.

In this manner, the number of permanent magnets joined to the connecting elements is minimized, and at the same time a continuous smooth flow of power is provided. In a large system it may very well be that magnets deployed continuously on the connecting elements would be useful, especially when upper and lower monorails are of the type shown in FIG. 3(c) as the power is transferred to the main monorail housing the linear generator.

FIG. 8(d) is a top cut view of a monorail system 200 with a full elongated oval track serving as a dual linear generator. Windings 510 are installed continuously throughout both the outside and inside of the monorail loop. FIGS. 8(c) and (d) illustrate the workings of the linkage element 504 at the curved ends of the track.

Figure 9A:
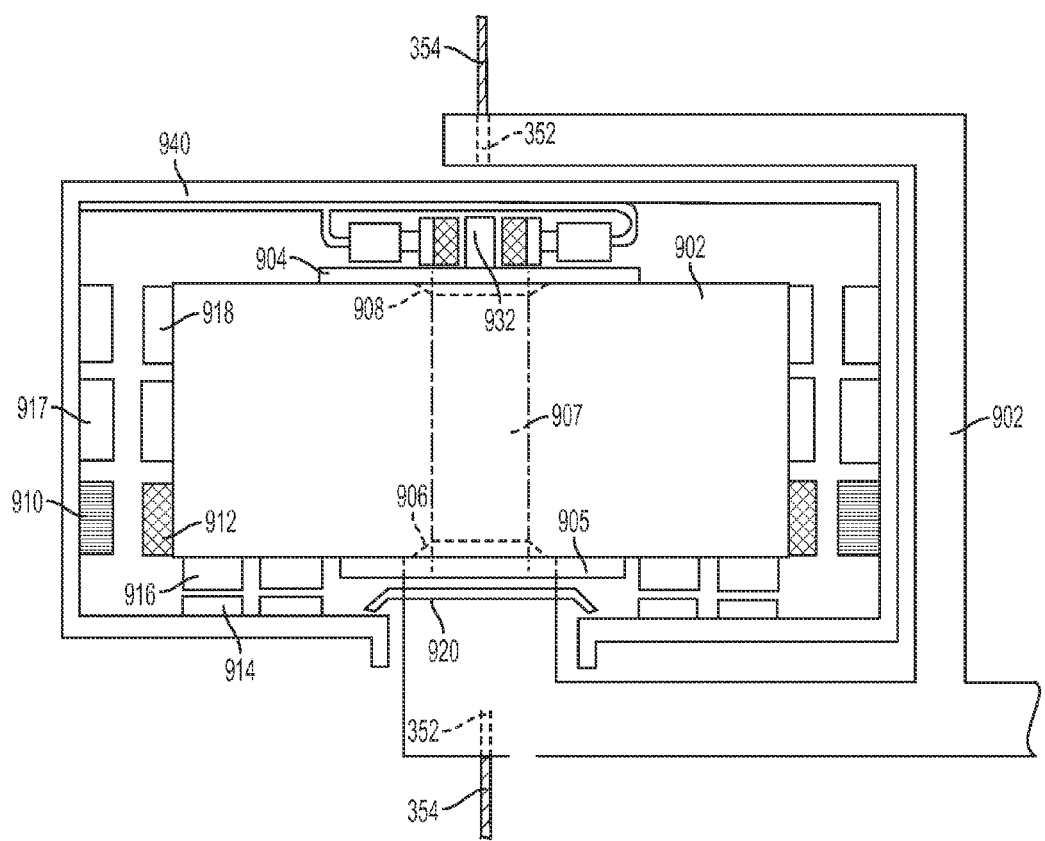
FIG. 9a is a front sectional view of a monorail in accordance with an aspect of the invention.

FIGS. 9(a) and (b) show a front cut and side sectional view, respectively, of a monorail 940 with an opening at the bottom with a passive maglev bogie conveyance assembly 902, and a side sectional view of a tandem bogie assembly 902 and 903. In this arrangement, opposing permanent magnets 916 can be fastened to monorail 940 and magnets 916 can be fastened to bogie unit 902 for levitation. Opposing permanent magnets 917 can be fastened to monorail 940 and magnets 918 can be fastened to bogie 902 for side thrust resistance. Electronic windings 910 are secured to the sides of the monorail and permanent magnets 912 can be fastened to the bogie to comprise a dual linear generator.

Any combination of linear generator configurations may be used here. For example, there is room for the four stage setup of FIG. 3a on top and to the sides of the bogie.

In FIG. 9(b), a second bogie 903 is shown and is hitched by at top bogie hitch element 904. A lower bogie hitch element 905 can comprise a tandem passive maglev bogie conveyance assembly 900 with a sail assembly support element 902 extending through and solidly attached to hitch portions 904 and 905. The tandem bogies 902 and 903 rotate on shafts 907 and 909 so as to traverse the end loop curved portions of the monorail oval loop. A sectional braking surface 932 is connected to the length of the hitch element 904 and the brake pad 328 is a length that can apply braking power to at least two sections 932 simultaneously. A baffle 920 is attached to the sail support assembly immediately above the bottom opening of the monorail 940 to reduce splashing in an under-water based application.

This design has two roles; namely, for use as a secondary monorail conveyance assembly or an alternative to the side exit design, or for use in a water application given that the extensions on the monorail 940 along with the baffle 920 can reduce or eliminate the splashing of water as it moves through the water as well as enabling a bubble for the train to operate within. This bubble works also as a ballast to reduce the weight on a submerged system. Additionally, the design provides a slimmer monorail shape.

The PTO permanent magnets 912 shown on the bottom rung can optionally be omitted from this design.

Figure 10A:
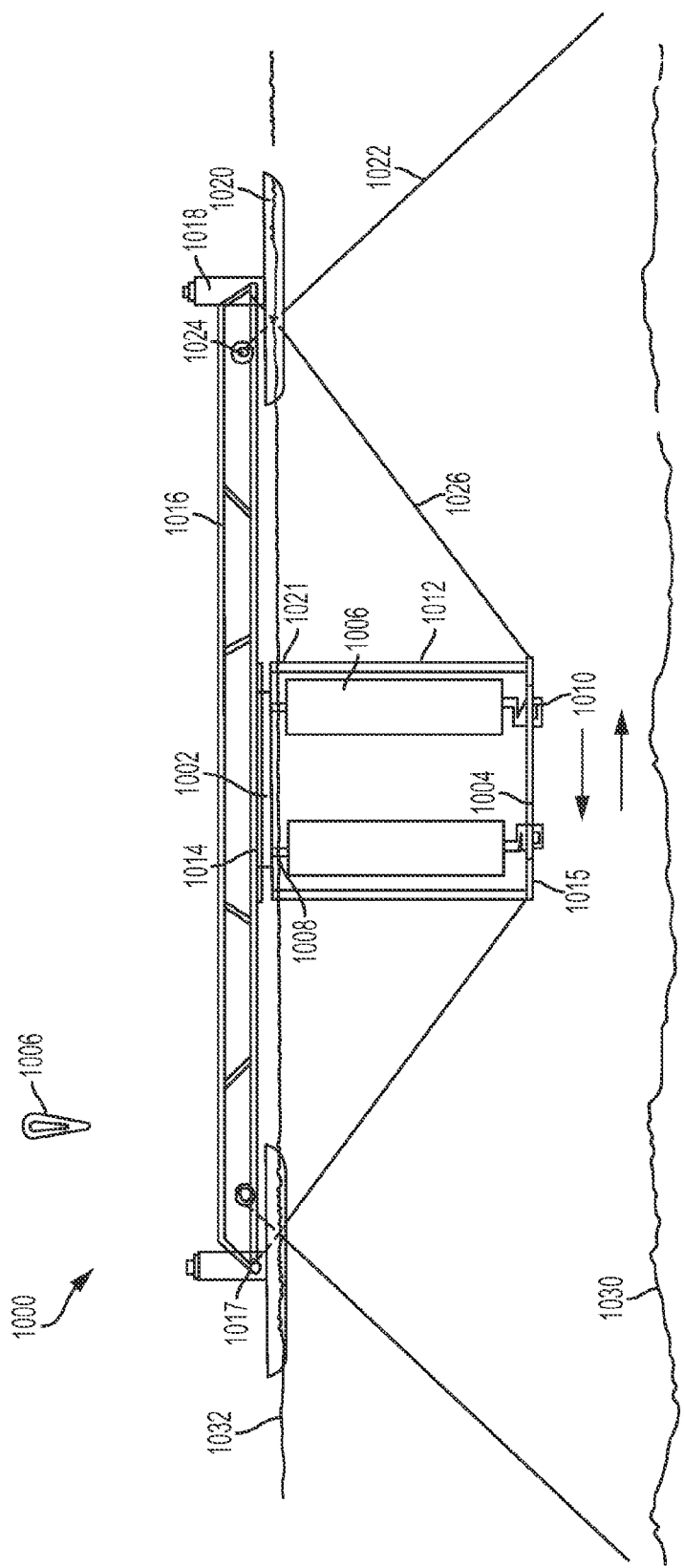
FIG. 10a is a side sectional view of a partially submerged monorail system.

FIG. 10(a) shows a side sectional view of a partially submerged hydro dual monorail system 1000 for water 1032 applications in tidal currents, oceans currents, hydro spillways, and flow of river. The upper monorail 1002 and the lower monorail 1004 have an opening for the hydrofoil assembly supports 1010 which extend out the bottom as shown in FIG. 9(a). An extension downwards on the monorail 940 and a baffle 920 create a bubble for the internal workings and reduces splashing. The system is supported within a frame 1012 which is attached to a lateral reinforced carrier frame 1016 that connects to a multi-stage lift 1018 at a latch pin 1017 all of which rests upon pontoons 1020. The bottom of the frame 1015 is guyed by cables 1026 to the carrier support frame 1016 and the assembly 1000 is guyed to anchors on the sea floor; river bed 1030. As the water level 1032 changes, sensors 1021 on the frame 1015 signal the wenches 1024 to adjust to keep the assembly 1000 at an optimum working level.

The air trapped inside the monorails and inside the hollow hydro foils 1006 can reduce the relative weight of the system.

The bubble type monorails shown at 1002 and 1004 can be similar to those illustrated in FIG. 9. Ballast tanks can also be provided with this system.

This system produces a minimal environmental footprint. If this system were used in a spillway behind a hydro plant or in a river, the cables holding the whole system in place may be guyed to the banks or a bridge, etc. This system is portable, it may be transported easily and quickly for maintenance and repairs. In the case of a flood or ice build-up, it may be moved. This system is more efficient; ocean currents and, more particularly, tidal currents, are resources that often present a rectangular shape. In any square area, using a circular PTO device (e.g., turbines or the prior art) fails to capture 21% in the corners.

Figure 10B:
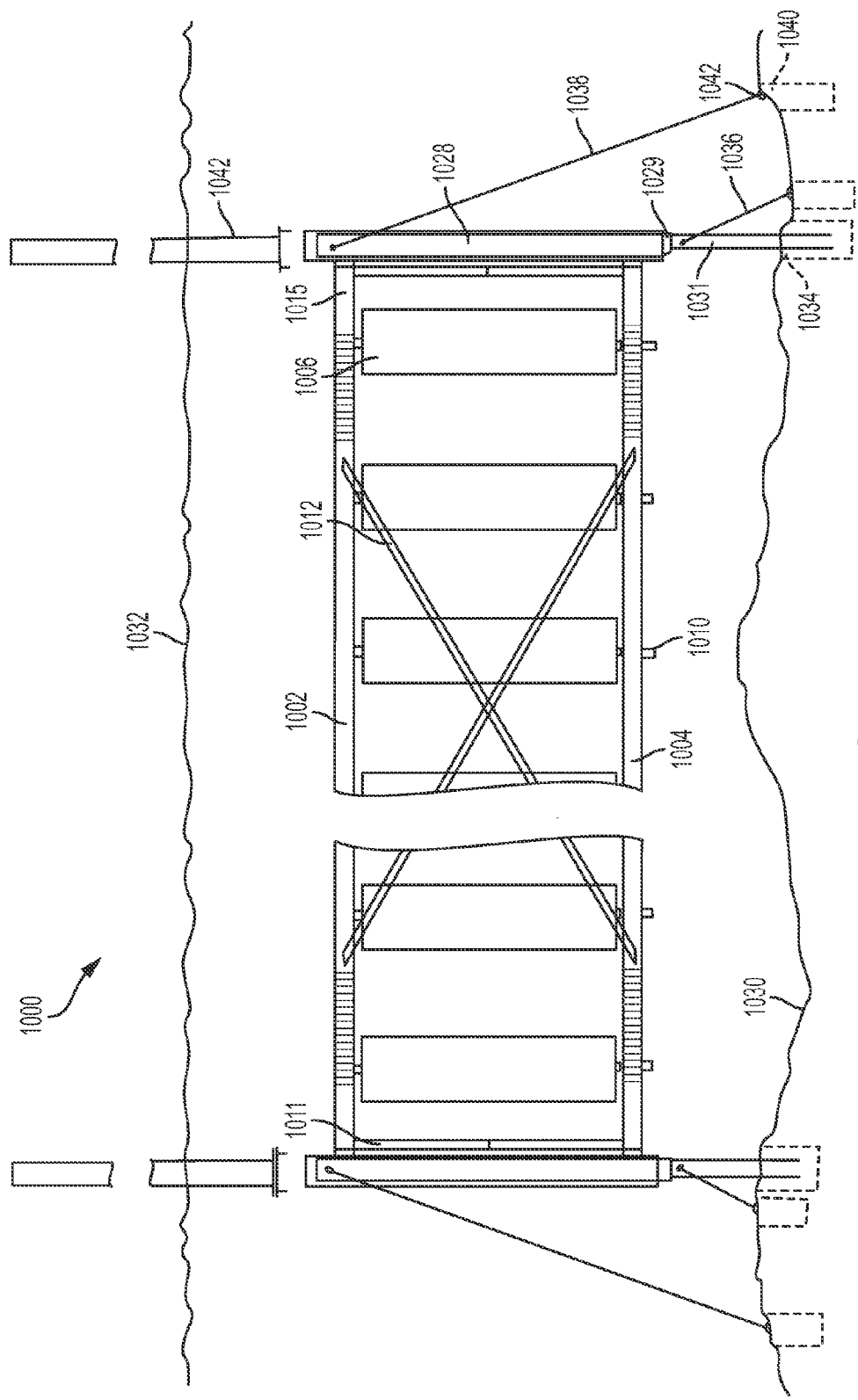
FIG. 10b is a front sectional view of a hydro monorail system.

FIG. 10(b) is a front sectional view of a hydro dual monorail system 1000 that is guyed to the waterway floor 1030 by cables 1038,1036 to anchors 1040. Support columns 1031 are anchored 1034 to the sea floor and are sleeved over by a multi stage lift by use of tubular columns 1029 and 1028 so that the system can be hoisted upward out of the water for maintenance and cleaning. Alternatively, an axillary lifting framework 1042 may be attached for lifting out of the water. Hydro-dynamically shaped bracing 1011 is attached to the end portions of the support frame 1015 in the same fashion as the hydro dynamic shaped bracing 1012.

Figure 10C:
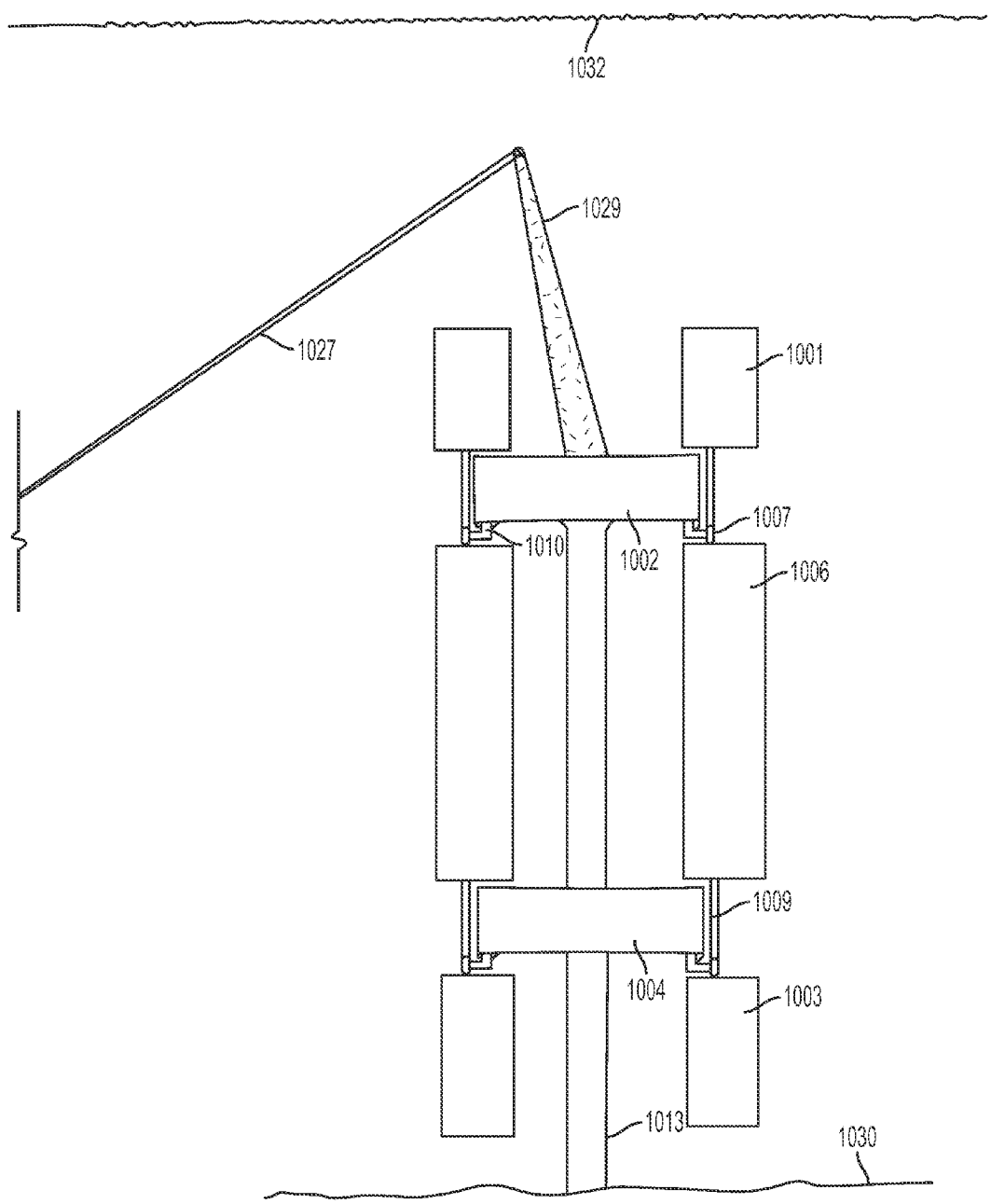
FIG. 10c is an end view of a fully submerged water application in accordance with an embodiment of the invention.

FIG. 10c is an end view of a fully submerged water application as it may appear in a deep ocean current setting. The element at the top is for bracing support to counteract the tipping force from the flow of the current against the right side of the drawing. In other words, this drawing is the curved end view as the straight lengths extend beyond and past the image.

FIG. 11 is a top full view of a body of water application 1100 of a series of barge 1106 mounted tiered monorail wind systems 1102 where each barge is linked together at linkage portion 1108 and 1110 and mounted on pontoons 1110 which are hitched my tubular sections 1112 to a central hitch point 1114 spaced apart by tubular sections 1116. A series of linked sections is secured to a single anchor 1120 by tubular sections 1118 at an anchor linkage point 1122.

Solid tubular linkage sections; 1112, 1116, and 1118 are used so as to eliminate slack and maintain positive positioning of the overall system 1100. In this configuration a single anchor provides a minimal environmental foot print relative to wind swept area and passively orients itself to operate downwind regardless of wind direction. Additionally, the rigidity of the tubular sections resists a system run on the anchor in the case of a sudden shift in wind direction.

The hitching elements 1118, 1116, 1114, and 1112 can be formed from cables, but in the case of a sudden shift in wind direction, there may be a run on the anchor because of slack. Thus, in some embodiments, we use rigid tubes/pipes. Having one major anchor to hold together as much of an off shore system as possible provides numerous advantages.

Figure 12A:
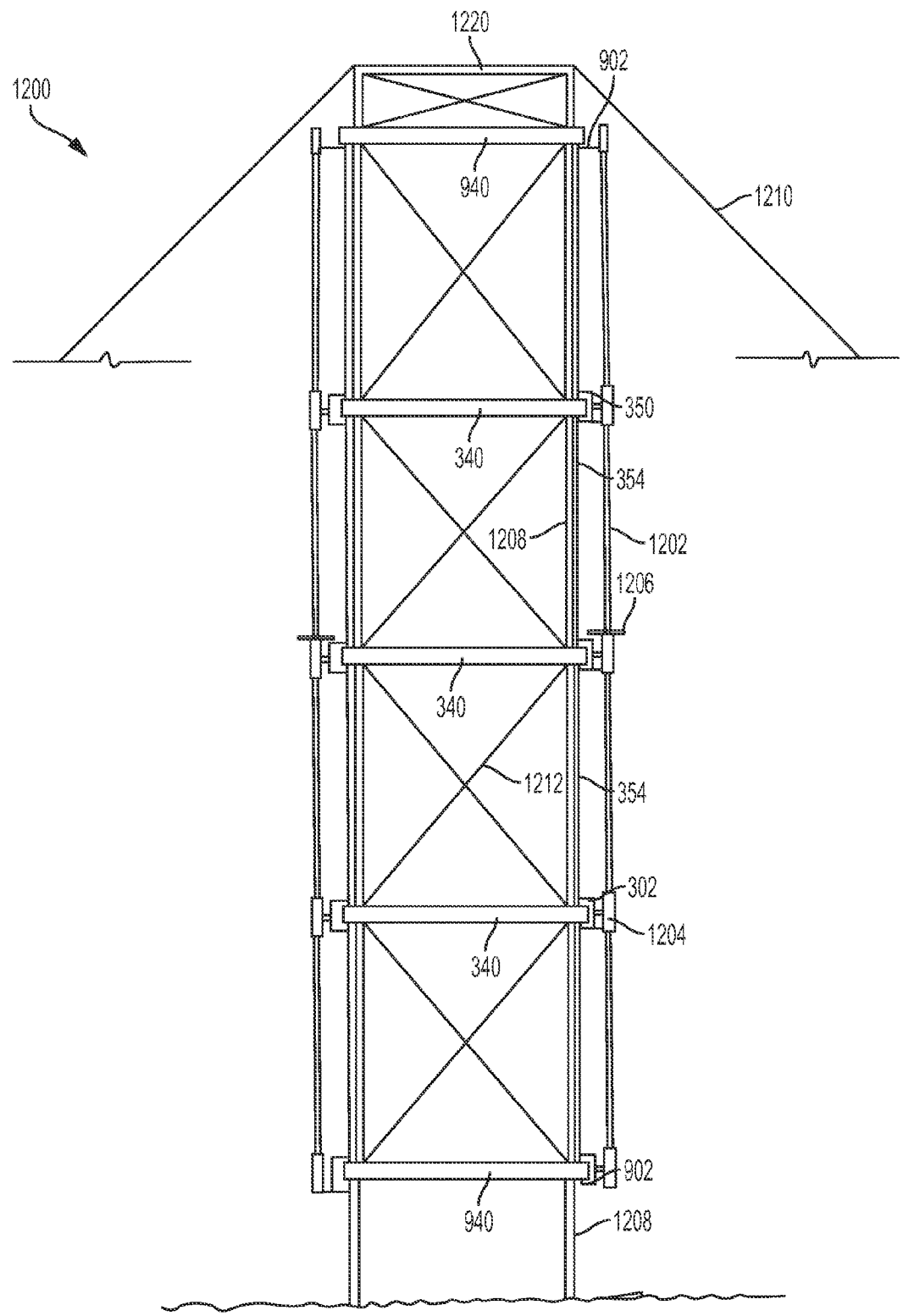
FIG. 12a is a side sectional view of a monorail system in accordance with an aspect of the invention.

FIG. 12(a) shows a side cut view of a tiered monorail system 1200 with airfoils 1202 that rotate within a collar 1204. The collar can be affixed to a sail support assembly 302 or 902 are positioned leading edge forward so as to show cables 354 affixed to segments 352 of the conveyance units 100 and 900 respectively, and attached so as to be in alignment with the center of the pivoting point i.e., center of linkage portion 303 and linkage point 902 on the monorail train. Tethering the cables from the center of the pivot points ensures continuous tension as the cables move with the train throughout the curved segments of the elongated oval loop. Structural support cables 1212 reinforce the tiered monorail system 1200 laterally from tower to tower and guy wires 1210 are hooked to a bracing frame 1220 positioned at the top of the system are anchored to the ground to resist swaying against the force of the wind.

FIG. 12(*b*) is an expanded side view of upper and lower airfoils 1202 with upper and lower mast members 1216 coupled and rotatable separately. The upper mast is fixed to a clasp ring 1218 that secures the vertical weight of the mast 1216 and is pivotal within the sleeved portion 1204 of the sail assembly support element 302 by a servo 1206 that is firmly attached to the sleeve.

The lower segment of the upper mast 1216 extends downward through the sleeve section 1204 into a tube shaped opening at the top of the lower mast 1217 and is free to rotate independently of the bottom mast segment on bearings 1214 and 1215. The length of the tube opening is sufficiently long to counteract lateral thrust and flex. Each, independently, servo navigated segment of airfoil is guided by at least one sensor. At least one solar panel 1219 is affixed to at least one airfoil.

Each individual section, in a stacked airfoil configuration, shown in FIG. 12(*a*) must traverse laterally at a given speed through a wind-swept area that has varying wind velocity. Multiple sensor guided servos enables appropriate orientation of individual sections at different heights and therefore varying wind characteristics.

The use of cable guying can provide the benefit of the ability to build the structures higher with much less mass.

Using the configuration of FIG. 12*b* provides a system more specifically responsive to varying wind characteristics at various heights. If the system is 300 to 400 ft high, the wind speed at the lower rung may be 6 m/s and 15 m/s at the top. Since the full vertical length is traveling at the same speed there is an advantage to be able to individually orient each sail section. Also, this scheme would simplify the construction of the system.

As shown in FIG. 12(*c*), the present system can utilize solar panels to increase the amount of electrical power generated.

It is to be understood that the above-referenced arrangements are illustrative of the application for the principles of the present invention. Numerous modifications and alternative arrangements can be devised without departing from the spirit and scope of the present invention while the present invention has been shown in the drawings and described above in connection with the exemplary embodiments(s) of the invention. It will be apparent to those of ordinary skill in the art that numerous modifications can be made without departing from the principles and concepts of the invention as set forth in the examples.

We claim:

1. A power generation assembly for use in generating electrical power from air or water currents, comprising:
    a rail system including at least one rail;
    a pair of braces extending orthogonally away from the rail on opposing sides of the rail;
    a vane assembly, drivable by the air or water currents;
    a car assembly, slidably mounted to the rail and coupled to the vane assembly, wherein movement of vanes of the vane assembly generates linear movement of the car assembly, the car assembly including a pair of forcer flanges extending from sides of the car assembly toward the rail of the rail assembly;
    an electrical energy generating system including four independent generators, each independent generator including four independent generators, each independent generator including:
        four independent stator windings arranged in pairs on opposing sides of the rail, each pair of stator windings arranged on opposing sides of one of the braces;
        an armature, carried by one of the pair of forcer flanges of the car assembly, wherein linear movement of the armature relative to one or more of the stator windings generates electrical energy; and
        a switching system, operable to controllably and individually activate and deactivate each of the four independent generators.

2. The assembly of claim 1, wherein the car assembly is supported by a wheel that travels within the rail of the rail system, the wheel vertically supporting a load of the car assembly.

3. The assembly of claim 2, wherein the wheel is pivotally coupled to a support post, and is pivotal about the support post to allow travel of the car assembly in either linear direction within the rail.

4. The assembly of claim 1, further comprising a series of permanent levitation magnets arranged within the rail, and a series of permanent levitation magnets arranged on the car assembly, the levitation magnets cooperatively providing a lifting force sufficient to levitate the car assembly and the vane assembly coupled to the car assembly.

5. The assembly of claim 4, wherein the levitation magnets arranged on the car assembly are carried by a pair of bogeys, each bogey coupled to the car assembly.

6. The assembly of claim 1, wherein the track comprises an oval or a circle.

7. The assembly of claim 6, wherein the stator windings are arranged in a substantially continuous array along the track.

8. The assembly of claim 6, wherein the stator windings are arranged in discontinuous, linear segments along the track.

9. A power generation assembly for use in generating electrical power from air or water currents, comprising:
    a rail system including at least one rail configured in an endless loop;
    a pair of braces extending orthogonally away from the rail on opposing sides of the rail;
    a vane assembly, drivable by the air or water currents;
    a car assembly, slidably mounted to the rail and coupled to the vane assembly, wherein movement of vanes of the vane assembly generates linear movement of the car assembly, the car assembly including a pair of forcer flanges extending from sides of the car assembly toward the rail of the rail assembly;
    an electrical energy generating system including four independent generators, each independent generator including four independent generators, each independent generator including:
        four independent stator windings arranged in pairs on opposing sides of the rail, each pair of stator windings arranged on opposing sides of one of the braces;
        an armature, carried by one of the pair of forcer flanges of the car assembly, wherein linear movement of the armature relative to one or more of the stator windings generates electrical energy; and a switching system, operable to controllably and individually activate and deactivate each of the four independent generators;

wherein the at least one rail is supported upon, or at least partially submerged in, a body of water.

10. The assembly of claim 9, wherein vanes of the vane assembly are at least partially submerged in the body of water.

11. A power generation assembly for use in generating electrical power from air or water currents, comprising:
- a rail system including at least one rail configured in an endless loop;
- a pair of braces extending orthogonally away from the rail on opposing sides of the rail;
- a vane assembly, drivable by the air or water currents;
- a car assembly, slidably mounted to the rail and coupled to the vane assembly, wherein movement of vanes of the vane assembly generates linear movement of the car assembly, the car assembly including a pair of forcer flanges extending from sides of the car assembly toward the rail of the rail assembly;
- an electrical energy generating system including four independent generators, each independent generator including four independent generators, each independent generator including:
  - four independent stator windings arranged in pairs on opposing sides of the rail, each pair of stator windings arranged on opposing sides of one of the braces;
  - an armature, carried by one of the pair of forcer flanges of the car assembly, wherein linear movement of the armature relative to one or more of the stator windings generates electrical energy; and
  - a switching system, operable to controllably and individually activate and deactivate each of the four independent generators; and at series of permanent magnets arranged within the rail, and a series of permanent levitation magnets arranged on the car assembly, the levitation magnets cooperatively providing a lifting force sufficient to levitate the car assembly and the vane assembly coupled to the car assembly.

12. The assembly of claim 11, wherein the track comprises an oval or a circle.

13. The assembly of claim 12, wherein the stator windings are arranged in a substantially continuous array along the track.

14. The assembly of claim 12, wherein the stator windings are arranged in discontinuous, linear segments along the track.

* * * * *